US012802686B2

(12) United States Patent
Rossi et al.

(10) Patent No.: US 12,802,686 B2
(45) Date of Patent: Nov. 17, 2026

(54) REAL-TIME INTERACTIVE VOICE CONVERSATION STATE MANAGEMENT IN LARGE LANGUAGE MODELS

(71) Applicant: Apple Inc., Cupertino, CA (US)

(72) Inventors: Francesco Rossi, Sunnyvale, CA (US); Nicholas Peretti, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 18/634,800

(22) Filed: Apr. 12, 2024

(65) Prior Publication Data

US 2024/0347058 A1 Oct. 17, 2024

Related U.S. Application Data

(60) Provisional application No. 63/495,961, filed on Apr. 13, 2023.

(51) Int. Cl.
*G10L 15/16* (2006.01)
*G10L 13/08* (2013.01)
(Continued)

(52) U.S. Cl.
CPC .............. *G10L 15/22* (2013.01); *G10L 13/08* (2013.01); *G10L 15/26* (2013.01)

(58) Field of Classification Search
CPC ...... G06F 16/3329; G06F 40/40; G06F 40/35; G06F 16/243; G06F 16/3344;
(Continued)

(56) References Cited

U.S. PATENT DOCUMENTS 7,809,569 B2 10/2010 Attwater et al.
7,930,183 B2 4/2011 Odell et al.
(Continued)

FOREIGN PATENT DOCUMENTS

CN 104584096 A 4/2015
CN 105845129 A 8/2016
(Continued)

OTHER PUBLICATIONS

PCT International Search Report and Written Opinion, PCT Application No. PCT/US2024/024499, Aug. 5, 2024, 11 pages.
(Continued)

*Primary Examiner* — Olujimi A Adesanya
(74) *Attorney, Agent, or Firm* — YHE Law LLP

(57) ABSTRACT

A method or system for managing interruptions during oral interactions between users and Large Language Models (LLMs). Initially, a user's spoken input is received and converted to text, which forms a prompt for the LLM. Upon generating a text response by the LLM, the text response is then converted back into speech and played to the user. If the user interrupts while the response is being played, the playback stops, and the interruption is captured as a new spoken input. This interruption is used to generate a new prompt for the LLM. Subsequently, the LLM generates a second text response based on the interruption, which is converted to speech and played back to the user. This process ensures that user interruptions are effectively managed, allowing for a more dynamic and interactive conversation with the LLM and enhancing the user's experience by adapting the conversation flow to real-time inputs.

20 Claims, 15 Drawing Sheets

(51) Int. Cl.
*G10L 15/22* (2006.01)
*G10L 15/26* (2006.01)

(58) Field of Classification Search
CPC .............. G06F 16/24522; G06F 16/248; G06F 16/338; G06F 40/284; G06F 16/90332; G06F 40/20; G06F 40/166; G06F 40/56; G06F 16/367; G06F 16/9038; G06F 40/205; G06F 40/253; G06F 16/332; G06F 16/33295; G06F 16/90335; G06F 30/27; G06F 16/24578; G06F 16/2471; G06F 16/31; G06F 16/906; G06F 16/9535; G06F 16/2455; G06F 16/24564; G06F 16/242; G06F 16/3331; G06F 16/3322; G06F 16/322; G06F 16/3335
See application file for complete search history.

(56) References Cited

U.S. PATENT DOCUMENTS

| | | | | |
|---|---|---|---|---|
| 8,005,679 | B2 | 8/2011 | Jordan et al. | |
| 8,112,280 | B2 | 2/2012 | Lu | |
| 8,370,145 | B2 | 2/2013 | Endo et al. | |
| 8,433,572 | B2 | 4/2013 | Caskey et al. | |
| 9,911,415 | B2 | 3/2018 | Vanblon et al. | |
| 10,043,516 | B2 | 8/2018 | Saddler et al. | |
| 10,078,487 | B2 | 9/2018 | Gruber et al. | |
| 10,249,300 | B2 | 4/2019 | Booker et al. | |
| 10,706,841 | B2 | 7/2020 | Gruber et al. | |
| 11,295,745 | B1 * | 4/2022 | Roy | G10L 15/30 |
| 11,423,886 | B2 | 8/2022 | Gruber et al. | |
| 12,002,471 | B2 * | 6/2024 | Varshney | G06F 3/167 |
| 12,243,517 | B1 * | 3/2025 | Mehrabani | G10L 15/063 |
| 12,327,562 | B1 * | 6/2025 | Bodigutla | G06N 7/01 |
| 12,579,969 | B1 * | 3/2026 | Liu | G10L 15/01 |
| 2007/0099636 | A1 | 5/2007 | Roth | |
| 2009/0132255 | A1 | 5/2009 | Lu | |
| 2009/0327263 | A1 | 12/2009 | Maghoul | |
| 2012/0271634 | A1 | 10/2012 | Lenke | |
| 2014/0142953 | A1 | 5/2014 | Kim et al. | |
| 2014/0188478 | A1 | 7/2014 | Zhang | |
| 2016/0180844 | A1 | 6/2016 | Vanblon et al. | |
| 2017/0345429 | A1 | 11/2017 | Hardee et al. | |
| 2020/0333875 | A1 | 10/2020 | Bansal et al. | |
| 2021/0151031 | A1 * | 5/2021 | Choo | G10L 15/04 |
| 2022/0059086 | A1 * | 2/2022 | Rajbhandari | G10L 15/30 |
| 2022/0093101 | A1 * | 3/2022 | Krishnan | G06V 40/20 |
| 2022/0115001 | A1 * | 4/2022 | Bratt | G10L 13/10 |
| 2022/0167049 | A1 * | 5/2022 | Carbune | G06F 3/165 |
| 2022/0292085 | A1 | 9/2022 | Shahriar et al. | |
| 2022/0293124 | A1 | 9/2022 | Weinberg et al. | |
| 2022/0308718 | A1 * | 9/2022 | Klein | G10L 15/08 |
| 2023/0215429 | A1 * | 7/2023 | Lembersky | G10L 15/04<br>704/251 |
| 2024/0038226 | A1 * | 2/2024 | Nouri | G10L 15/063 |
| 2024/0202539 | A1 * | 6/2024 | Poirier | G06F 16/338 |
| 2024/0311402 | A1 * | 9/2024 | Baeuml | G06F 40/149 |
| 2024/0386877 | A1 | 11/2024 | Schlakman et al. | |
| 2025/0232134 | A1 * | 7/2025 | Shekhar | G06F 40/295 |

FOREIGN PATENT DOCUMENTS

| | | | |
|---|---|---|---|
| EP | 3035329 | A1 | 6/2016 |
| JP | 2010-66519 | A | 3/2010 |
| WO | 2014/040022 | A2 | 3/2014 |

OTHER PUBLICATIONS

International Preliminary Report on Patentability received for PCT Patent Application No. PCT/US2024/024499, mailed on Oct. 23, 2025, 7 pages.

* cited by examiner

700

710 2:03:05 pm – 5s
Prompt based on user speech:
I would like a recipe for meatloaf.

720 2:03:06 pm – 30s
LLM response:
Certainly! Here's a straightforward recipe for a classic meatloaf that's easy to follow and yields a delicious result. This recipe serves 6-8 people.

Ingredients:
- 1 1/2 pounds ground beef (80% lean/20% fat)
- 1 large egg
- 1 onion, finely chopped
- 1 cup milk

. . . .

730 2:03:08 pm – 3s
Prompt based on user speech:
[#Cancel->"I interrupted your answer"] I would like a vegan one please.

740 2:03:09 pm – 30s
LLM response:
Got it! Here's a recipe for a delicious vegan meatloaf that's hearty and satisfying, even for those who aren't following a plant-based diet. This recipe serves 6-8 people.

Ingredients:
- 1 cup lentils, rinsed (green or brown lentils work best)
- 2 1/2 cups vegetable broth
- 1 large onion, finely chopped

. . . .

FIG. 7

REAL-TIME INTERACTIVE VOICE CONVERSATION STATE MANAGEMENT IN LARGE LANGUAGE MODELS

CROSS-REFERENCE TO RELATED APPLICATIONS

This application claims the benefit of U.S. Provisional Application No. 63/495,961, filed Apr. 13, 2023, which is incorporated by reference in its entirety.

BACKGROUND

This disclosure relates generally to real-time voice conversations with large language models (LLMs) and, more specifically, to managing interruptions and maintaining the flow of real-time conversations between users and LLMs.

A large language model (LLM) like GPT (Generative Pre-trained Transformer) is an advanced artificial intelligence system designed to understand and generate human-like text based on the input it receives. These models are trained on vast amounts of text data, enabling them to comprehend context, answer questions, compose text, and even engage in conversation in a manner that closely resembles human interaction.

For example, LLMs can generate articles, reports, stories, language tutoring lessons, and even poetry. They can assist writers by suggesting content improvements, generating ideas, or overcoming writer's block. LLM can also be integrated into chatbots and virtual assistants; businesses can automate customer service, providing quick and accurate responses to inquiries, which enhances customer experience and operational efficiency. LLMs are also capable of understanding and translating languages, making them valuable tools for global communication and content localization, reducing language barriers between individuals and businesses. LLMs can also be used to create personalized learning materials, provide tutoring, generate quiz questions, and offer explanations on topics, thereby enhancing the learning experience. LLMs, especially those trained in coding languages, can also assist developers by generating code snippets, debugging, or even explaining code, thus improving productivity and learning in software development.

SUMMARY

Embodiments described herein include a method or a system for managing interruptions during verbal conversations between users and large language models (LLMs). The system receives a first speech input from a client device of a user, and converts the first speech input into first text. The system then generates a first prompt for the LLM based on the first text, and transmits the first prompt to the LLM, causing the LLM to generate a first text response. Upon receiving the first text response from the LLM, the system converts the first text response into a first speech response and transmits the first speech response back to the client device, causing the client device to play the first speech response to the user.

At the same time, the system also causes the client device to monitor a surrounding environment for detecting vocal interruptions from the user. A vocal interruption comprises a second speech input from the user. Upon detecting the vocal interruption during the play of the first speech response, the system causes the client device to stop playing the first speech response. The system converts the second speech input into a second text input, and generates a second prompt to the LLM based on the vocal interruption. For example, in some embodiments, the prompt may be annotated with metadata associated with vocal interruption, such as the timing of the interruption, and the state of the conversation when the vocal interruption is detected. The system transmits the second prompt to the LLM, causing the LLM to generate a second text response. Upon receiving the second text response from the LLM, the system converts the second text response into a second speech response, and transmits the second speech response back to the client device, causing the client device to play the second speech response.

In some embodiments, the embodiments include a method or a device for managing interruptions during verbal conversations between users and LLMs. The device plays a first speech response signal on a client device of a user during a vocal conversation between the user and an LLM system. The device detects a vocal interruption from the user during the playing of the first speech response signal and before an end of the playing of the first speech response signal. Upon detecting the vocal interruption, the device stops playing the first speech response signal and generates a second speech response signal based on the vocal interruption, and plays the second speech response signal on the client device of the user.

BRIEF DESCRIPTION OF THE DRAWINGS

FIG. 7 illustrates an example text record of a conversation in accordance with one or more embodiments.

Figure 1:
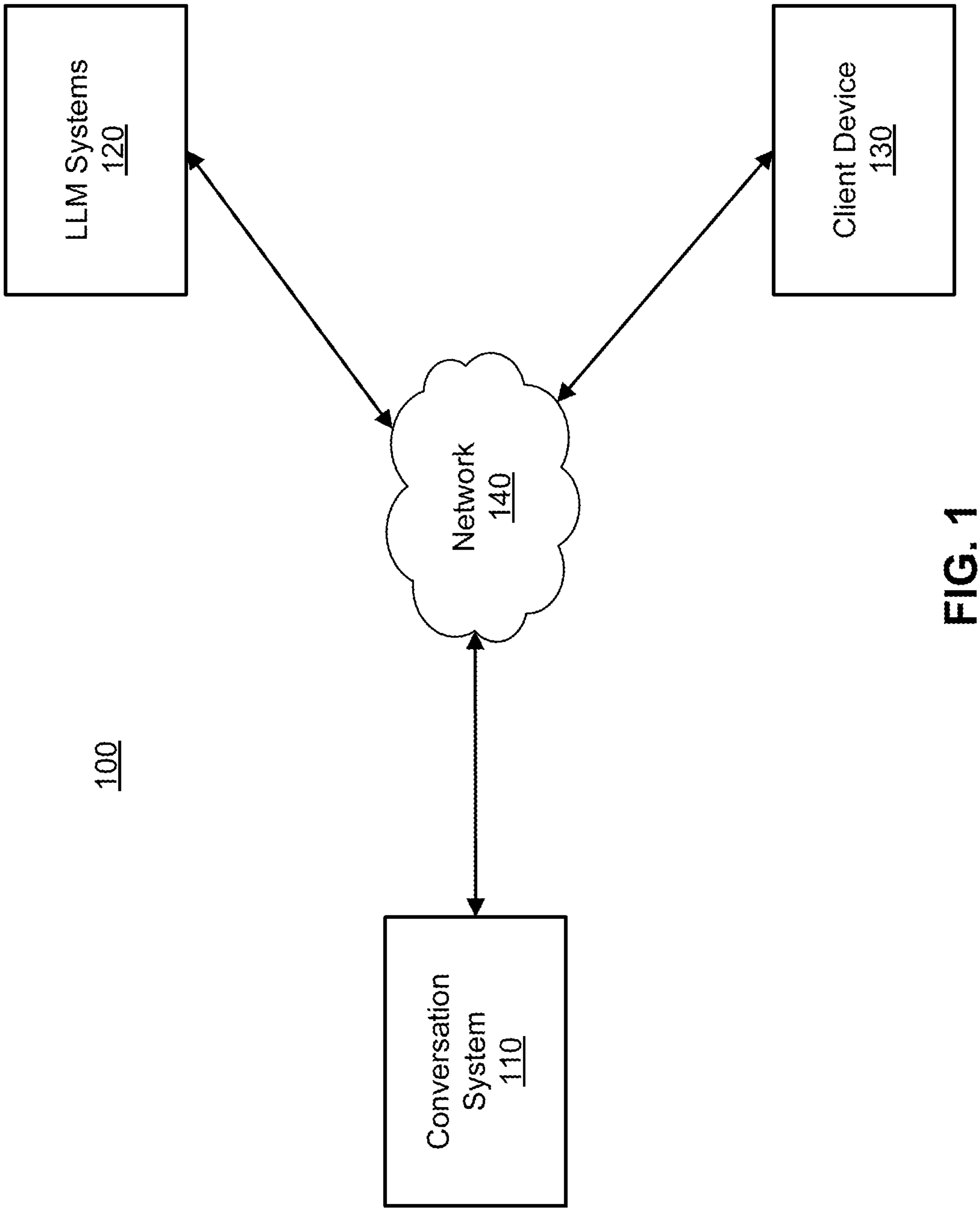
FIG. 1 is a block diagram of a system environment in which an online system, such as a conversation system, operates in accordance with one or more embodiments.

The figures depict embodiments of the present disclosure for purposes of illustration only. One skilled in the art will readily recognize from the following description that alternative embodiments of the structures and methods illustrated herein may be employed without departing from the principles or benefits touted by the disclosure described herein.

DETAILED DESCRIPTION

The integration of large language models (LLMs) into real-time voice or video conversation platforms opens up a plethora of innovative applications, including (but not limited to) customer support, language learning, healthcare advice, personal assistance, language tutoring, and interview simulations. Despite the promising applications, several challenges must be addressed to fully realize the potential of real-time voice or video conversations with LLMs.

In particular, real-time interaction with LLMs during voice or video calls demands not just low latency but also dynamic conversation flow management. Users engaging with these models seek prompt responses, often wanting the flexibility to interrupt or steer the conversation without waiting for lengthy replies to conclude. This necessitates a system where the user's need to interject—a result of impatience, a change in query, or a misunderstanding—is seamlessly integrated into the conversation flow, enhancing the interaction experience.

Embodiments described herein relate to a system or a method for improved management of interactive voice conversations with LLMs by handling the interruptions effectively. Whether due to the user's intent to fast-forward the dialogue, correct a perceived error, or modify their query, the system is able to adapt to the user's intent. This involves fading out the LLM's response upon interruption, signaling attentiveness through auditory cues like a gentle beep or a verbal prompt, and, if necessary, recalibrating the LLM's response strategy based on the nature and timing of the interruption.

In some embodiments, the system employs state management, incorporating metadata such as response timing, voice tone, and even visual cues in video chats, to maintain a coherent and responsive dialogue. This metadata may be integrated directly into the LLM's prompt or managed by a response modification module, which can modify responses to acknowledge interruptions or adapt the conversation tone based on detected frustration or misunderstanding.

In some embodiments, post-interruption, the system can either revert to address the user's initial request anew, taking into account the latest input, or proceed by incorporating the interruption into the dialogue context, enhancing the LLM's response relevance. In some embodiments, LLMs are trained or fine-tuned on this augmented state space. In some embodiments, the system includes a response modification module configured to refine responses, ensuring the conversation remains fluid and user-centric.

In some embodiments, proactive strategies are implemented to minimize interruptions caused by premature LLM responses. By employing probabilistic methods to assess whether a user has finished speaking or is merely pausing, the system can better decide when to initiate a response, thereby reducing unnecessary interjections. Adjusting response timings based on cues like hesitation phrases allows the system to demonstrate patience and attentiveness, fostering a more natural and respectful dialogue.

In some embodiments, in cases where the conversation involves complex reasoning or when a user seeks specific information mid-discourse, the system causes the LLM to succinctly redirect the conversation or summarize previous reasoning steps, ensuring clarity and continuity despite interruptions.

The embodiments described herein facilitate verbal conversations with LLMs that mimic human interaction, characterized by flexibility, understanding, and adaptability. Through state management and responsive design, the system offers beyond mere responses to user requests; it creates a perception of genuine engagement, thereby narrowing the gap between human expectations and technological capabilities.

System Architecture

FIG. 1 is a block diagram of a system environment 100 in which an online system, such as a conversation system 110 as further described below in conjunction with FIGS. 2 and 7, operates. The system environment 100 shown by FIG. 1 comprises one or more client devices 130, a network 140, one or more LLM systems 120, and the conversation system 110. In alternative configurations, different and/or additional components may be included in the system environment 100.

The conversation system 110 is configured to communicate with the client device(s) 130 and LLM system(s) 120 via the network 140. The client device 130 may include one or more microphones, one or more cameras, and one or more speakers. The client device 130 is configured to listen to speech input from a user and sends the received speech input to the conversation system 110. Upon receiving the speech input, the conversation system 110 is configured to convert the speech input into a text input. The conversation system 110 then generates a text prompt for the LLM system 120 based on the text input and sends the text prompt to the LLM system 120. Upon receiving the text prompt from the conversation system 110, the LLM system 120 generates a text response based on the text prompt and sends the text response to the conversation system 110. The conversation system 110 then converts the text response into a speech response and sends the speech response to the client device 130, causing the client device 130 to play the speech response to the user.

Further, the conversation system 110 causes the client device 130 to monitor a surrounding environment for detecting vocal interruptions that comprise a new speech input by the user. Upon detecting a vocal interruption during the play of the previous speech response, the conversation system 110 causes the client device to stop playing the previous speech response. The conversation system 110 converts the new speech input into a new text input and generates a new text prompt based on the vocal interruption. Note that this updated text prompt doesn't just include the new textual input; it also integrates metadata related to the vocal interruption. This may include (but is not limited to) speaker identity, tone information, the conversation's state at the moment of interruption and a signal indicating that the user has interrupted the previous response. The conversation system 110 then transmits the new text prompt to the LLM system 120, causing the LLM system 120 to generate a new text response. Upon receiving the new text response from the LLM system 120, the conversation system 110 converts the new text response into a new speech response and transmits the new speech response back to the client device, causing the client device to play the new speech response.

Notably, the client device 130 may be caused to constantly monitor the surrounding environment to detect vocal interruptions at any time during a conversation, including before or during a speech response is generated or played. The conversation system 110 determines a response action based on the timing when the interruption is received. This process repeats as long as the user continues the conversation. As such, the conversation system 110 can engage users beyond merely responding to requests. The conversation system 110 creates a perception of genuine engagement, thereby narrowing the gap between human-to-human interactions and technological capabilities.

In some embodiments, the conversation system 110 may divide a conversation cycle into a plurality of states, including a listening state, a speech-to-text state, a prompt generation state, a text response generation state, a text-to-speech state, a response generation state, and a speech-playing state. For example, in the listening state, the conversation system 110 is awaiting input from the user. Once the conversation system 110 receives speech, it enters the speech-to-text state. In the speech-to-text state, the spoken input from the user is converted into a textual format. The prompt generation state refers to a state where the conversation system 110 processes the text input, determines context of the text input, and formulates a text prompt that will guide the LLM system 120 in its search for information or formation of a response. The text response generation state refers to a state where the LLM system 120 processes the text prompt. Alternatively, or in addition, the conversation system 110 determines the state further based on a time interval between the start of the speech response and the beginning of the new speech input, e.g., within 1 second, within 2 seconds, within 5 seconds, etc.

In some embodiments, the states may be divided differently. For example, when the LLM is a multimodal LLM, the listening state, speech-to-text state, among others may be combined into a single state at the LLM.

Upon determining a state when the vocal interruption is received, the conversation system 110 determines a response based on the state of the conversation. In some embodiments, a machine learning model may be trained to generate or modify responses based on a current state when a vocal interruption is received. In some embodiments, the response is a continuer response (e.g., "Uhm, go on.") generated by the conversation system 110. Alternatively in addition, the response may be generated by the LLM and modified by the conversation system 110.

In some embodiments, the conversation system 110 causes a user agent application to be installed on the client device 130. In some embodiments, the functions of the conversation system 110 and the client device 130 may be divided differently. For example, in some embodiments, the user agent application on the client device 130 may be able to perform speech-to-text or text-to-speech conversions. In some embodiments, users can provide feedback during or after conversations through the user agent application. Simple feedback might be binary, for example, selecting a thumbs up or thumbs down. More complex feedback could include additional options, such as feedback about clarity of response, relevance of information, completeness of the answer, speed of response, voice interaction quality, emotional tone, improvement suggestions, willingness to use the system again, and specific features utilized, among others. The user feedback combined with voice metadata may later be used to retrain or fine-tune the LLM or the state model.

The LLM system(s) 120 may include a closed-source LLM system, such as OpenAI's GPT-3, GPT-4, HyperCLOVA, Gopher, Chinchilla, BloombergGPT, etc. The LLM system(s) 120 may also include an open-source LLM system, such as LLAMA2, BLOOM, Grover, OpenChatKit, BERT, Falcon 40B and 180B, OPT-175B, XGen-7B, GPT-NeoX, GPT-J, Vicuna 13-B, mistral, Animato-L1, etc. Open-source LLMs have their source code and underlying architecture publicly accessible. The conversation system 110 may retrain an open-source LLM with state data collected during conversations and/or user feedback to cause the LLM to generate a response based on the current state when a vocal interruption is received. Closed-source LLMs have proprietary source code and model weights, which are not publicly accessible, limiting customization and adaptation possibilities. Although some closed-source LLM may not be easily modified, some closed-source LLM still can be fine-tuned or able to learn from context in prompts. For example, the conversation system 110 can include metadata (such as a current state when a vocal interruption is received) as context in text prompts to enable the LLM to learn from the context in generating responses.

In some embodiments, the LLM system 120 includes a multimodal LLM configured to take audio input directly and understand, process, and generate responses based on the received audio input, among other modalities. The LLM system 120 can interpret and analyze spoken language, convert it into textual format for internal processing, and then perform a range of tasks, such as answering questions, generating text, and/or creating audio responses.

The conversation system 110 may be a server, server group or cluster (including remote servers), or other suitable computing device or system of devices. The conversation system 110 may include applications configured to communicate with other devices, including those associated with the LLM systems 120 and client devices 130, over the network 140. Examples of client devices 130 include conventional computer systems (such as a desktop or a laptop computer, a server, a cloud computing device, and the like), mobile computing devices (such as smartphones, tablet computers, mobile devices, and the like), or any other device having computer functionality. The client device 130 and the conversation system 110 are configured to communicate via the network 140, for example, using a native application executed by the devices or through an application programming interface (API) running on a native operating system of the devices, such as IOS® or ANDROID™. In another example, the client devices 130, and the conversation system 110 communicate via applications or APIs running on the conversation system 110. Additional details about the conversation system 110 are further described below with respect to FIGS. 2-7.

The network 140 may comprise any combination of local area and/or wide area networks, using wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

Example Conversation System

Figure 2:
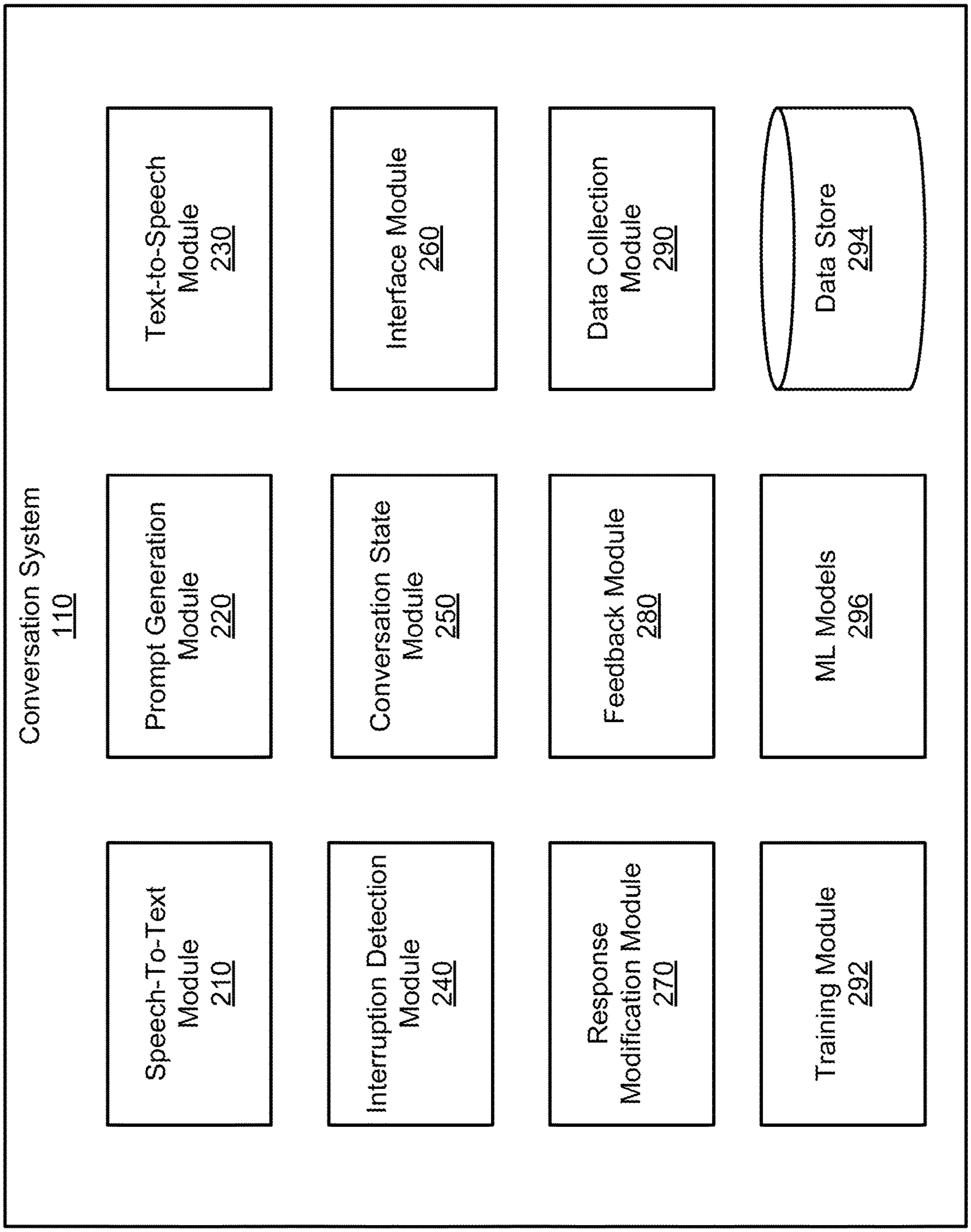
FIG. 2 illustrates an example architecture of the conversation system in accordance with one or more embodiments.

FIG. 2 illustrates an example architecture of the conversation system 110 in accordance with one or more embodiments. The conversation system 110 includes a text-to-speech module 210, a prompt generation module 220, a text-to-speech module 230, an interruption detection module 240, a conversation state module 250, an interface module 260, a response modification module 270, a feedback module 280, a data collection module 290, a training module 292, a data store 294, and one or more machine-learning models 296. In alternative configurations, different and/or additional components may be included in the system environment 100.

The speech-to-text (STT) module 210 is configured to perform voice or speech recognition, i.e., converting spoken language into text. In some embodiments, the STT module 210 uses deep neural networks (DNNs), such as (but not limited to) convolutional neural networks (CNNs), recurrent neural networks (RNNs), and/or long short-term memory (LSTM) networks, to process audio signals and identify their correlation with linguistic units like phonemes. In some embodiments, the STT module 210 is configured to determine a likelihood of a sequence of words to ensure output text makes linguistic sense. In some embodiments, the STT module 210 uses statistical models to understand context, grammar, and the structure of the language. In some embodiments, the STT module 210 is configured to analyze the audio signal to identify distinct features like pitch, tone, and speed. These features are used to help distinguish between different sounds and understand speech patterns. In some embodiments, the STT module 210 may be part of the LLM system 120.

The prompt generation module 220 is configured to generate a text prompt to an LLM system 120 based on the text generated by the STT module 210. In some embodiments, the prompt generation module 220 is configured to clean the original text generated by the TTS module 210, such as removing any irrelevant words from the text. In some embodiments, the prompt generation module 220 is configured to add context or additional instructions that help the LLM system understand the prompt's intent, such as metadata associated with a current state of a conversation or a vocal interruption. In some embodiments, the prompt generation module 220 is further configured to structure the prompt in a format that is optimized (or at least better) for the LLM's input requirements.

Once the LLM system 120 receives the prompt generated by the prompt generation module 220, the LLM system 120 generates a text response based on the prompt. The text-to-speech (TTS) module 230 is configured to convert the text response into a speech response. In some embodiments, the TTS module 230 analyzes the text response generated by the LLM system 120, including parsing the text response to understand its structure, such as sentences, phrases, and words. In some embodiments, the TTS module 230 converts the raw text into a standardized format, including abbreviations (e.g., "Dr." to "Doctor"), numbers (e.g., "123" to "one hundred twenty-three"), and special characters into their spoken equivalents. In some embodiments, the TTS module 230 may also perform part-of-speech tagging to understand the role of each word in a sentence, which helps in determining the pronunciation of words that can vary based on context (e.g., "read" in past tense vs. present tense). In some embodiments, the processed text is then converted into phonemes, which are the smallest units of sound in a language. This step may include the use of phonetic dictionaries or preset rules that determine how words are pronounced. Alongside phonetic transcription, the TTS module 210 may also generate prosody information, which includes the rhythm, stress, and intonation patterns of the speech to make the speech sound natural and convey the correct meaning, especially for languages with tonal variation.

In some embodiments, the TTS module 210 may use a large database of pre-recorded speech segments, selecting and concatenating these segments to form complete utterances. The segments can range from phonemes to words or sentences. The naturalness of the speech depends on the variety and quality of the recorded samples. In some embodiments, parametric synthesis (also known as formant or articulatory synthesis) may be used to generate speech. The parametric synthesis method uses models to generate speech to simulate the physical processes of sound production and the properties of human vocal tracts. In some embodiments, neural network synthesis may be used to generate deep learning models to generate speech. The deep learning models can produce highly natural and expressive speech by learning from vast amounts of recorded speech data.

The interruption detection module 240 is configured to detect interruption. An interruption occurs if the user begins speaking either before a speech response starts or while it is still playing. Interruptions can result from the user's impatience or desire to steer the conversation differently. They may also happen if the user, believing they have understood the essence of the system's message, wishes to correct, challenge, or expand on that understanding, perhaps due to a perceived mistake or misunderstanding. Additionally, a user might interrupt if they reconsider their query or the conversation's direction. Finally, interruptions can be triggered by the user's need to clarify a point or to share urgent information.

The conversation state module 250 is configured to determine and track states of each conversation. For example, potential conversation states may include (but are not limited to) a listening state, a speech-to-text state, a prompt generation state, a text response generation state, a text-to-speech state, a response generation state, and a speech-playing state. In some embodiments, the conversation state module 250 is configured to reset a state of the conversation based on timing of an interruption or a type of an interruption.

In some embodiments, the conversation state module 250 collaborates with the interruption detection module 240 to determine a type of an interruption. For example, if an interruption is detected either before a speech response begins, the interruption detection module 240 may determine the interruption is a first type, and the conversation state module 250 reverts a state of the conversation (e.g., prompt generation state, text-to-speech state, a response generation state, or a speech-playing state) to a prior state (e.g., listening state). As another example, if an interruption is detected when the speech response just starts, the conversation state module 250 may determine the interruption is a second type and cause the response modification module 270 to generate a new response, overriding or modifying the original response generated by the LLM system 120. Additional details about the response modification module 270 are further described below. As another example, if an interruption is detected after the speech response has been playing for a threshold time period, the interruption detection module may determine the interruption is a third type, and the conversation state module 250 updates a state of the conversation to a different state.

The conversation state module 250 may also log metadata related to conversation states or interruptions, and cause the prompt generation module 220 to incorporate the metadata into prompts. The metadata may include (but is not limited to) a special token, a keyword, and/or a description. For example, responsive to detecting that an interruption occurred during a text-to-speech state, the prompt may include [#cancel] followed by a combination of the user's initial input and a new input in the interruption.

The interface module 260 is configured to transmit text prompt generated by the prompt generation module 220 to the LLM system 120 and receive text response generated by the LLM system 120. In some embodiments, the interface module 260 performs these communications via an API provided by the LLM system 120. The API provides a standardized way for the interface module 260 to access the capabilities of the LLM system 120. The LLM system 120 receives a prompt from the interface module 260 via the API, generates a response based on the received prompt, and sends the response back to the interface module 260 via the API.

The response modification module 270 is configured to generate a response or modify the received response from the LLM system 120 based on a state of conversation when an interruption is detected or a type of interruption. For example, if an interruption is detected shortly after a speech response starts to play, the response modification module 270 may be configured to generate a continuer response, such as "Uhm, go on." In some embodiments, the response is generated from a small, instant language model that is coupled to the conversation system 110. if the vocal interruption occurs beyond a second threshold time In some embodiments, the response modification module 270 may also be configured to shorten a response based on a type of interruption.

The feedback module 280 is configured to receive user feedback during or after conversations. In some embodiments, the feedback module 280 may allow users to input a simple binary feedback, for example, selecting a thumbs up or thumbs down. In some embodiments, the feedback module 280 provides additional feedback options, such as feedback about clarity of response, relevance of information, completeness of the answer, speed of response, voice interaction quality, emotional tone, improvement suggestions, willingness to use the system again, and specific features utilized, among others.

The data collection module 290 is configured to collect data associated with conversations and states of conversations, including (but not limited to) user inputs, LLM responses, timestamps (e.g., time and date of each interaction), user session data (e.g., session/conversation duration and any unique session/conversation identifiers), user identifiers, interaction flow (e.g., a sequence of questions and answers in a conversation, which helps in understanding how users navigate through conversations and where they might encounter issues), feedback and ratings, technical information (e.g., information about the user's device, browser, or app version), among others. The collected data is stored in the data store 294.

The training module 292 is configured to train one or more machine-learning models 296 using the collected data. The machine-learning model may be trained to generate responses based on a conversation state when an interruption is detected. The training dataset may include examples of interruptions and their corresponding metadata about their states and timing. In some embodiments, the examples are also labeled with reasons for the corresponding interruptions, such as misunderstanding, impatience, and any change in the user's tone. In some embodiments, additional features are also extracted, such as audio features like speech rate, volume, and pitch, in addition to textual features extracted through speech-to-text processes. For video conversations, visual features such as facial expressions, gestures, and mouth movements may also be considered.

In some embodiments, the training module 292 is configured to use sequence modeling to handle the temporal nature of conversations. The machine learning model 296 may be trained to understand the flow of a conversation, recognize when an interruption occurs, and determine the state of the conversation at that moment. In some embodiments, the training module 292 incorporates state management data in the machine-learning model 296's architecture to maintain a dynamic representation of the conversation's context, such as tracking the focus of the conversation, a user's intent, and any pending topics that need to be addressed after an interruption. In some embodiments, the machine-learning model 296 is trained to dynamically adjust the conversation state based on a determined type of interruption and generate a response appropriate to the type of interruption and the new state of the conversation. In some embodiments, the machine-learning model 296 is configured to generate empathetic responses, seek clarification, or adjust the response strategy based on the user's behavior and the conversation's context.

In some embodiments, the training module 292 further uses user feedback received by the feedback module 280 to retrain or fine-tune the machine learning model 296. In some embodiments, the training module 292 employs continuous learning techniques to refine the machine-learning model 296 as it encounters more diverse conversation patterns and interruption types. The training module 292 regularly updates the machine learning model 296 with new data and feedback to improve its accuracy and responsiveness.

In some embodiments, the conversation system 110 is also configured to generate video accompanying the speech response. In some embodiments, the video may be generated by another generative model hosted on a remote server. Alternatively, the video may be generated by a machine learning model 296 trained or fine-tuned by the conversation system 110.

Figure 3:
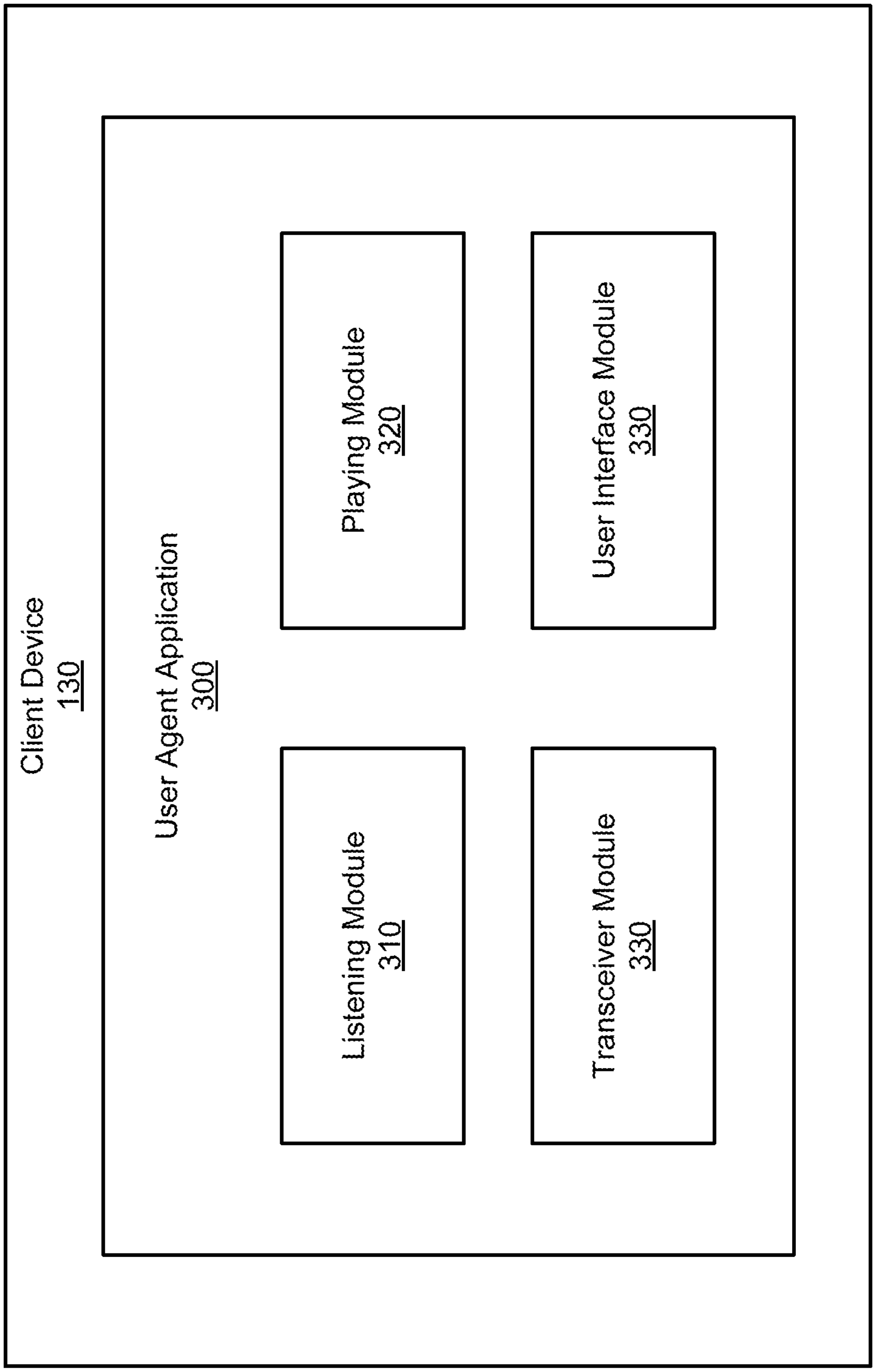
FIG. 3 illustrates an example architecture of a client device in accordance with one or more embodiments.

FIG. 3 illustrates an example architecture of a client device 130 in accordance with one or more embodiments. The client device 130 may include (but is not limited to) a smartphone, a tablet, a laptop, a desktop, a smartwatch, an e-reader, a gaming console, a smart home device, a wearable fitness tracker, a virtual reality (VR) and/or augmented reality (AR) headset, a digital camera, a portable media player, a drone, among others. The client device 130 may have a user agent application 300 installed thereon. The user agent application 300 includes a listening module 310, a playing module 320, a transceiver module 330, and a user interface module 330.

The listening module 310 is configured to listen to a user's speech input. In some embodiments, the listening module 310 continuously monitors ambient audio and is ready to record a user's speech. In some embodiments, the listening module 310 is in a low-power "listening" mode, where they continuously monitor ambient audio for a specific wake word or phrase. When the listening module 310 detects the wake word, it switches to an active listening mode, ready to record a next spoken speech. The recording may be an audio file of the user's speech.

In some embodiments, the listening module 310 employs echo cancellation to allow the client device 130 to filter out a sound that is currently playing (e.g., a speech response) from the speech input it captures through its microphones. The listening module 310 identifies a sound pattern of the client device's own output and subtracts it from the ambient noise and audio it captures, isolating the user's speech input. In some embodiments, the listening module 310 is configured to determine a direction from which a user's speech input is coming to dynamically adjust which microphone is prioritized in an array of microphones, focusing on picking up sound from the direction of the user.

The transceiver module 330 is configured to transmit the recorded audio file to the conversation system 110, which in turn performs voice recognition, obtains a text response from the LLM system 120, and generates a speech response based on the text response. The speech response is then sent back to the transceiver module 330 of the client device 130, which causes the playing module 320 to play the speech response to the user. In some embodiments, playing module 320 includes an audio player configured to play the speech response. Alternatively, or in addition, the playing module 320 may also include a video player configured to play a video accompanying the speech response. The video may also be received from the conversation system 110.

In some embodiments, the user interface module 330 may be a graphical user interface enabling users to manually initiate, interrupt, or end a conversation using interactive elements. Additionally, the user interface module 330 may also allow for user feedback and display a text transcript of the conversation. In some embodiments, the client device 130 may also have the capability to store either the text or audio record of the conversation on the client device 130 and the user can review the text record or replay the audio record via the user interface module 330.

Figure 4A:
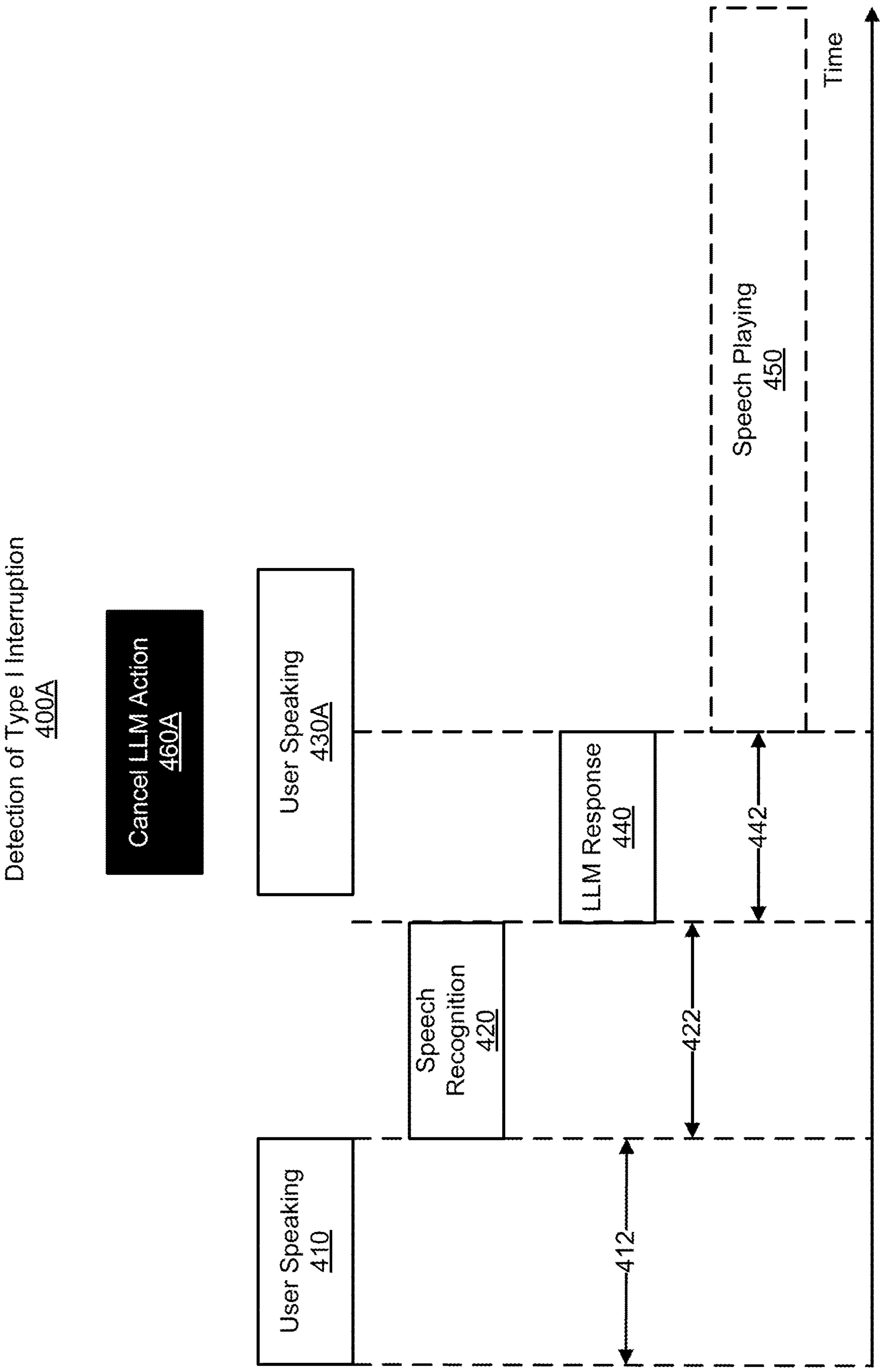
FIG. 4A illustrates an example process of detecting a first type of interruption in a conversation in accordance with one or more embodiments.

FIG. 4A illustrates an example process 400A of detecting a first type of interruption in a conversation in accordance with one or more embodiments. The horizontal axis represents time. During a first time period 412, a user is speaking 410. This period 412 corresponds to a listening state of the conversation. During a second time period 422, the conversation system 110 performs speech recognition (i.e., speech-to-text operation). This time period 422 corresponds to a speech-to-text state of the conversation. During a third time period, 442, the LLM system 120 receives the text prompt and generates 440, a text response based on the text prompt. This period 442 corresponds to a response generation state. After the response generation state, the conversation system 110 will generate a speech response and cause the speech response to be played 450 at the client device 130, which corresponds to a speech-playing state.

However, before the LLM system 120 finishes the generation of the response 440, the user speaks 430*a* again. Due to the timing of the user's second speech 430A detected before the speech playing 450, the conversation system 110 determines that the interruption is a first type of interruption, and causes the LLM system 120 to cancel 460A its action of generating the response. The cancellation can be initiated by a prompt that indicates the cancellation of the previous action and/or discarding the previously generated response. The prompt may also indicate regenerating a response that integrates the new user input with the previous input. For example, the prompt may be: "Please disregard the previous response; consider this additional context: [insert new user input here]. Based on this, generate a new response."

Figure 4B:
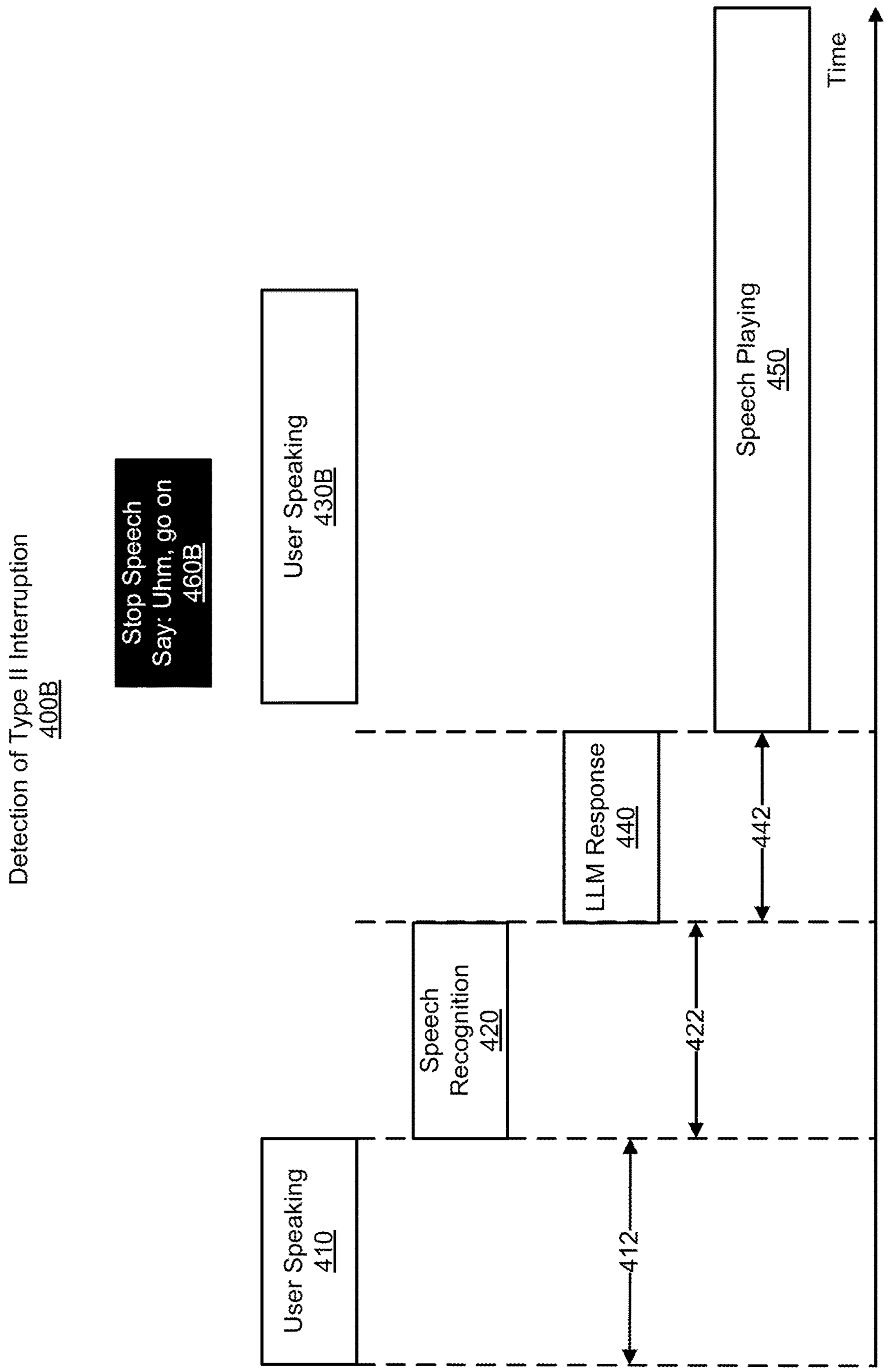
FIG. 4B illustrates an example process of detecting a second type of interruption in a conversation in accordance with one or more embodiments.

FIG. 4B illustrates an example process 400B of detecting a second type of interruption in a conversation in accordance with one or more embodiments. The first three states of the conversation in FIG. 4B are the same as those in FIG. 4A. The user speaks 410 first, the conversation system 110 performs speech recognition 420, and the LLM system 120 generates a response 440. After that, the conversation system 110 performs speech generation and causes the speech to be played 450 to the user at the client device 130. At the very beginning of this speech-playing state, the user starts to speak 430B again.

Due to the timing of the user's second speech 430B detected before a first threshold time of the speech playing 450, the conversation system 110 determines that the interruption is a second type of interruption, and causes the speech playing 450 to stop and generate 460B a continuer voice response, e.g., "Uhm, go on." This response signals to the user that the conversation system 110 is still actively listening and interested in what they have to say, encouraging them to continue their train of thought or query. This response also recognizes that the user has made an interruption, which might be due to various reasons such as seeking to add more information, needing clarification, or correcting a mistake in the previous query, creating a natural and fluid conversation flue.

Figure 4C:
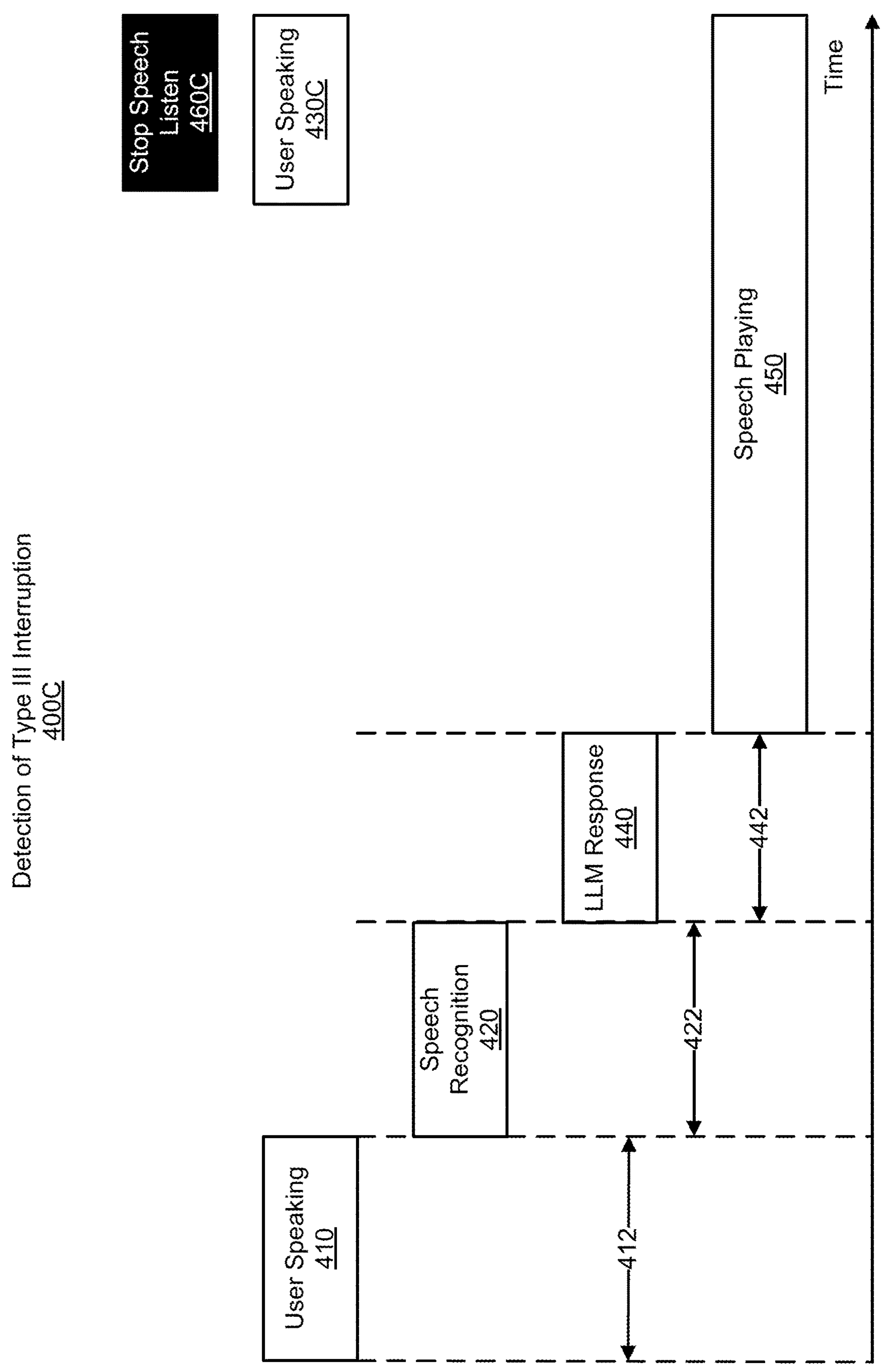
FIG. 4C illustrates an example process of detecting a third type of interruption in a conversation in accordance with one or more embodiments.

FIG. 4C illustrates an example process 400C of detecting a third type of interruption in a conversation in accordance with one or more embodiments. Again, four states of the conversation in FIG. 4C are the same as those in FIG. 4B. However, the user's interruption comes in later during the speech playing state. This interruption indicates that the response is probably relevant, but too long. The user may want to steer the conversation in another direction. Due to the timing of the user's second speech 430C detected after a second threshold time of the speech playing 450, the conversation system 110 determines that the interruption is a third type of interruption, and causes the speech playing 450 to stop speech playing, and revert 460C the state of the conversation back to the listening state.

Figure 4D:
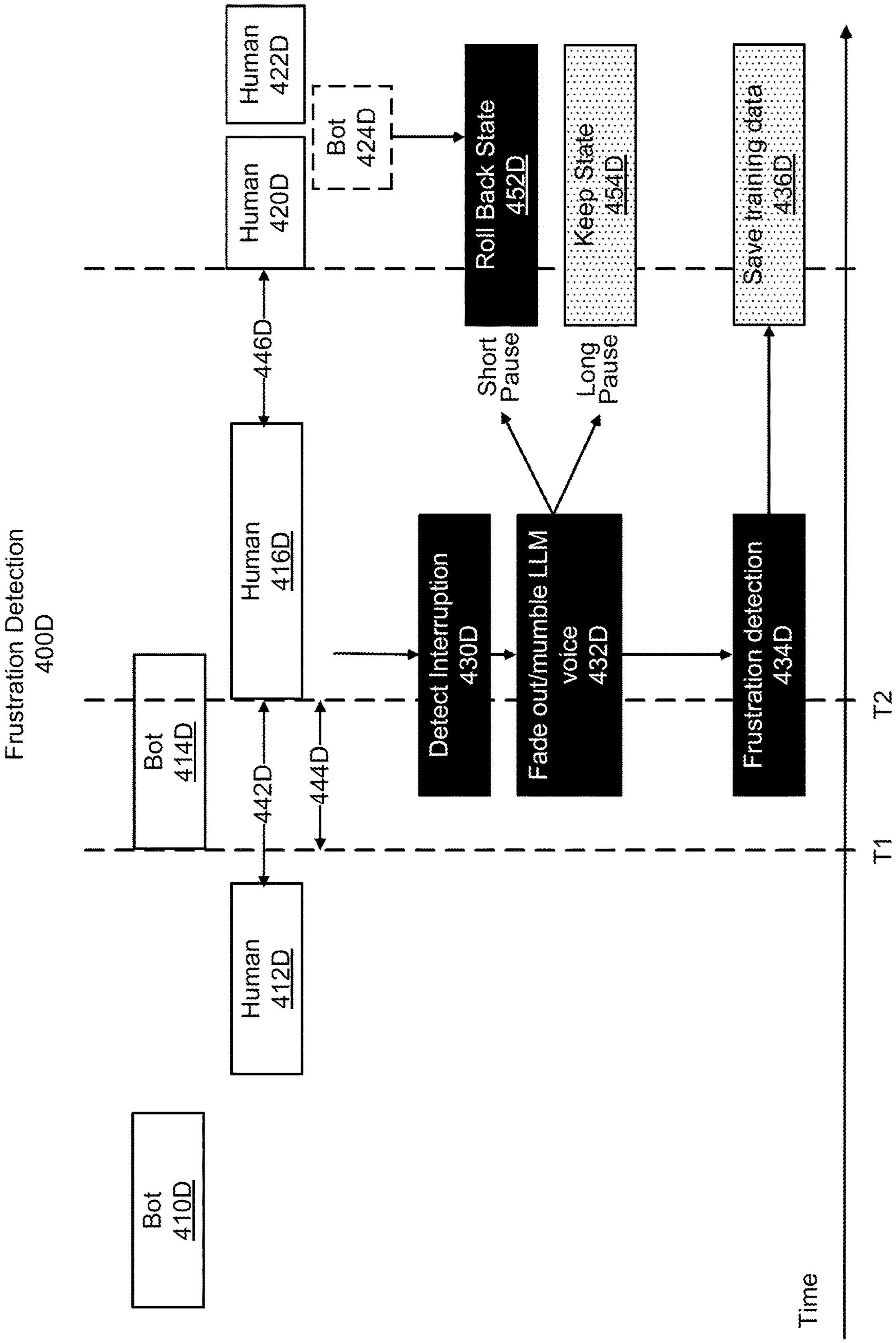
FIG. 4D illustrates an example process of detecting user frustration in a conversation in accordance with one or more embodiments.

In some embodiments, the conversation system 110 is further configured to detect user frustration during conversations. FIG. 4D illustrates an example process 400D of detecting user frustration in a conversation in accordance with one or more embodiments. The boxes 410D, 414D, and 424D labeled as "bot" represent periods during which an audio response generated by the conversation system 110 is being played. The boxes labeled as "human" 412D, 416D, 420D, and 422D represent periods during which a user is speaking.

Prior to time T1, a conversation between the user and the conversation system 110 proceeds uninterrupted. Subsequently, at time T2, the user begins to speak during period 416D before a previous audio response 414D concludes. Based on the timing of the user's speech 416D, the conversation system 110 detects 430D an interruption at time T2, causing the audio response 414D to fade out 432D. Furthermore, during the user's speech 416D, the conversation system 110 also evaluates a tone of the user and identifies 434D whether the user is frustrated based on the determined tone of the user. In some embodiments, the conversation system 110 applies a machine learning model 296 to data associated with the user speech 416D to determine the tone of the user. In some embodiments, the data related to the detected frustration may be saved 436D for training or retraining a machine learning model 296.

In addition, the conversation system 110 also determines whether to roll back the conversation state based in part on a pause 442D between user's two speeches 412D and 416D, a pause 444D between the starting of the audio response 414D and the start of the user speech 416D, and/or a pause 446D between user's two speeches 416D and 420D. For example, if the pause 444D is less than a threshold time, the conversation system 110 determines that the pause is a short pause, causing a roll back 452D of the conversation state to a previous state; otherwise, the conversation system 110 maintains 454D the current state.

Figure 5:
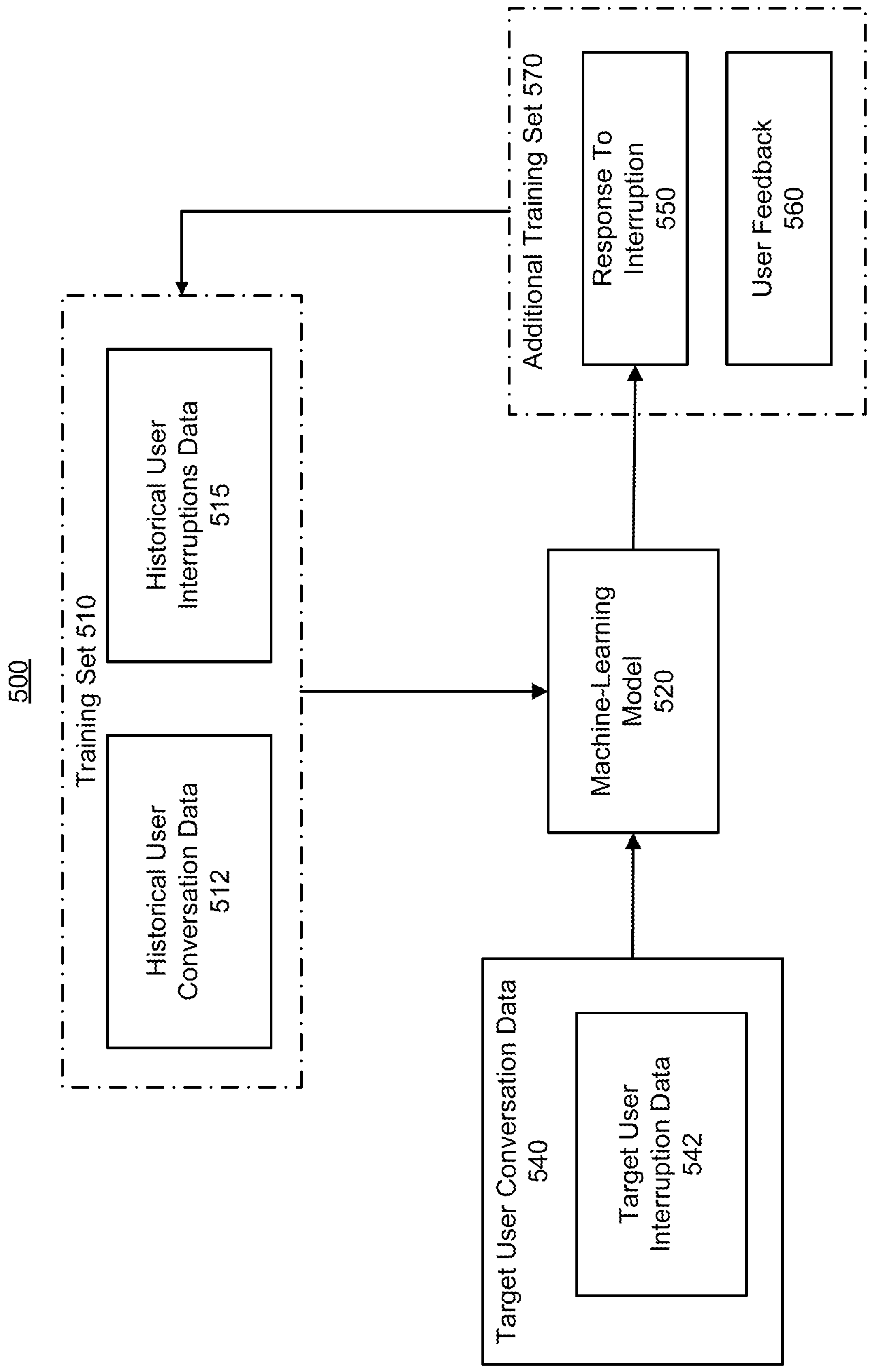
FIG. 5 illustrates an example process of training or retraining a machine learning model 520 in accordance with one or more embodiments.

FIG. 5 illustrates an example process 500 of training or retraining a machine learning model 520 in accordance with one or more embodiments. In some embodiments, the machine-learning model may be a language model configured to generate a continuer response (e.g., "Uhm, go on.") upon detecting a particular type of interruption. In some embodiments, the machine-learning model is a large language model used by the LLM system 120. The machine learning model 520 is trained over a training set 510. The training set 510 includes historical user conversation data 512, and historical user interruptions data 515. The historical user conversations data 512 may include (but is not limited to) records of interactions between users and LLMs, along with relevant metadata like timestamps marking user inputs and LLM replies. The historical user interruption data 515 contains information related to disruptions in the conversations between users and LLMs, such as the conversation's state at the moment an interruption occurs and a time interval from the start of a speech response to a detection of an interruption.

In some embodiments, the historical user interruption data 515 may be labeled or annotated with additional metadata, such as reasons for the interruption, and states of the conversations when the interruptions occurred. Reasons for the interruption may include (but are not limited to) impatience, misunderstanding, correction to previous user input, etc. In some embodiments, the historical user interruption data 515 may be labeled or annotated with additional metadata, such as continuer responses generated in response to the interruptions, and resetting the state of the conversation. The continuer responses may include (but are not limited to) acknowledgment responses, empathetic responses, and clarification requests.

In some embodiments, the machine-learning model 520 is trained to receive target user conversation data 540 as input and detect when an interruption is likely to occur based on the context of the conversation and the user's previous behavior. In some embodiments, the machine-learning model is trained to determine a speech completion score indicating a likelihood of whether the user has finished speaking. Responsive to the speech completion score greater than a threshold, the conversation system 110 generates a prompt for the LLM system 120 and causes a speech response to be played at the client device 130. On the other hand, responsive to the speech competition score lower than the threshold, the conversation system 110 refrains from generating a prompt or playing the speech.

In some embodiments, the machine-learning model 250 is trained to determine a complexity score indicating a level of complexity of the conversation. Responsive to the complexity score greater than a threshold, the conversation system 110 generates a prompt for the LLM system 120, causing the LLM system 120 to summarize the conversation, thereby verifying with the user that the conversation has been correctly understood.

In some embodiments, the machine-learning model 250 is trained to receive target user interruption data 542 as input and identify the type of interruption and/or its cause. In some embodiments, the machine-learning model 250 is further trained to generate a response 550 that addresses the cause of the interruption, including (but not limited to) an empathetic response, seeking clarification, and/or correcting a misunderstanding.

In some embodiments, users can provide feedback 560 after receiving the response 550 or after the conversation is over. In some embodiments, additional training set 570 is generated based on the responses 550 and user feedback 560. The conversation system 110 employs continuous learning to refine the machine-learning model 520 as more diverse conversations and interruption patterns are received and handled by the machine-learning model 520.

Figure 6A:
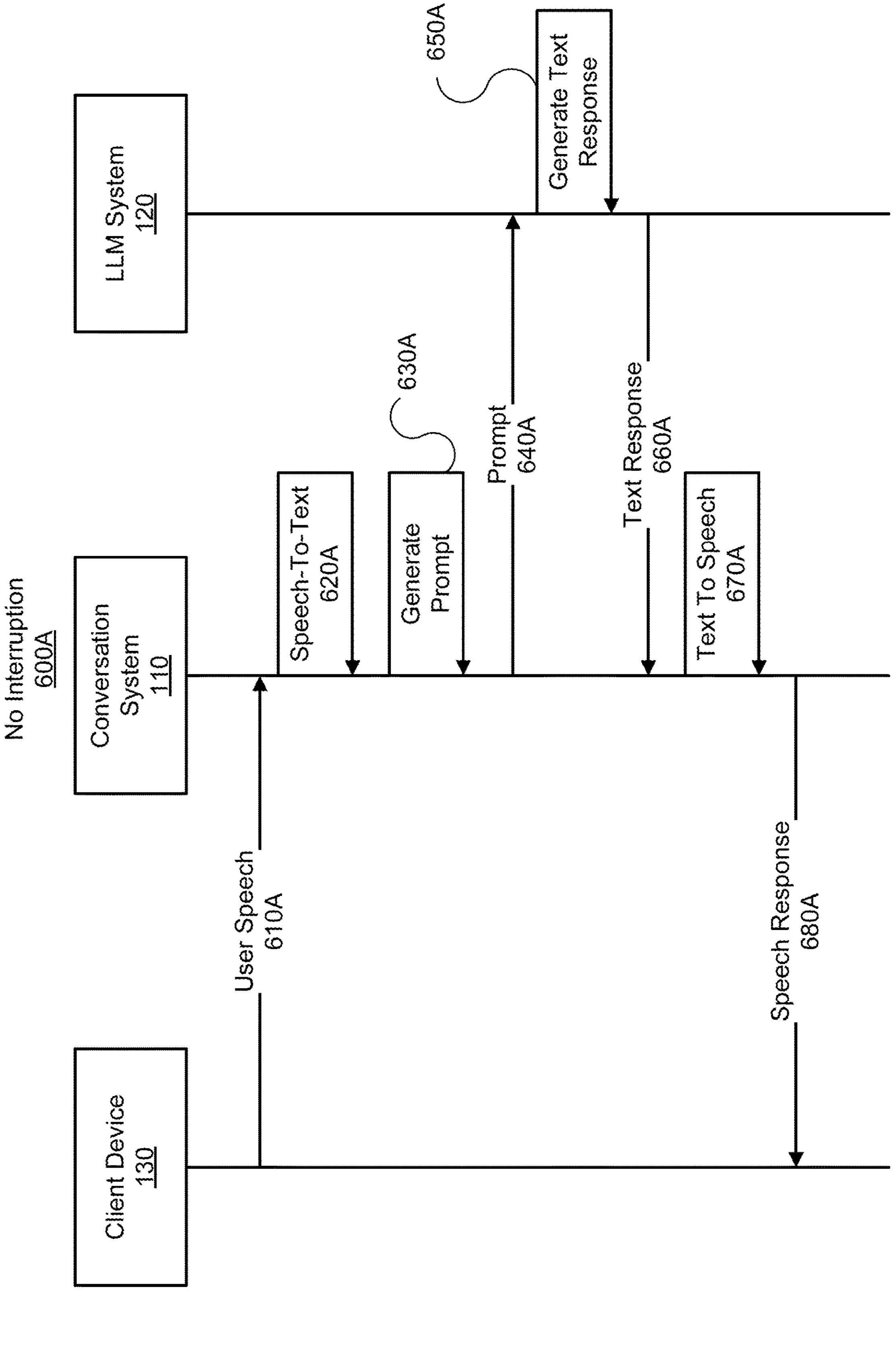
FIG. 6A illustrates an example communication pattern of a conversation, in which no interruption is detected in accordance with one or more embodiments.

FIG. 6A illustrates an example communication pattern 600A of a conversation, in which no interruption is detected in accordance with one or more embodiments. The conversation starts with a user speech 610A received at the client device 130 and transmitted from the client device 130 to the conversation system 110. Upon receiving the user speech 610A, the conversation system 110 performs speech-to-text operation 620A, converting the user speech in audio form into text. The conversation system 110 then generates 630A a prompt based on the text, and transmits the prompt 640A to the LLM system 120. Upon receiving the prompt 640A, the LLM system 120 generates 650A a text response, and transmits the text response 660A back to the conversation system 110. The conversation system 110 in turn performs the text-to-speech operation 670A to convert the text response to a speech response, and transmits the speech response 680A back to the client device 130, causing the client device 130 to play the speech response 680A to a user.

Figure 6B:
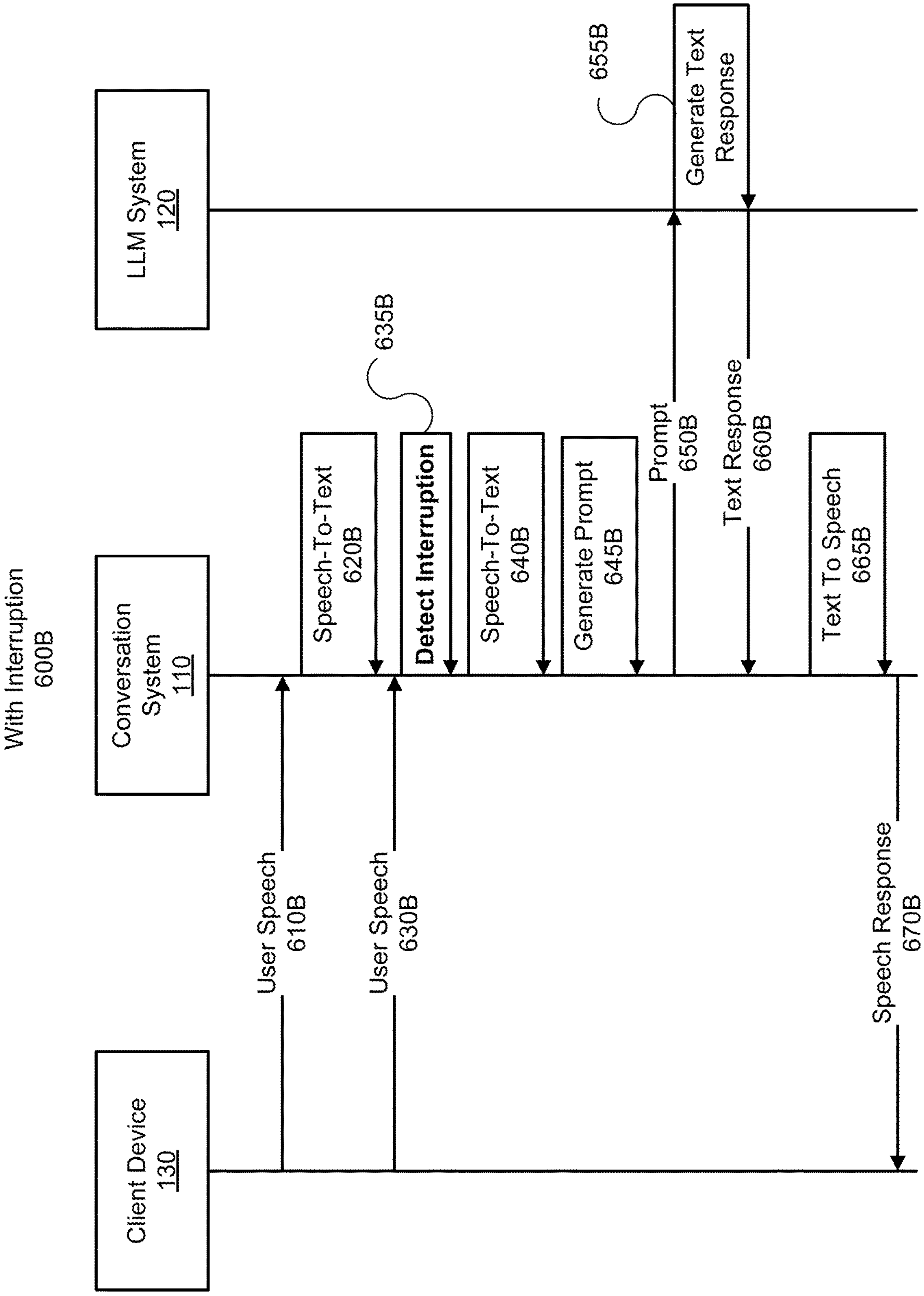
FIG. 6B illustrates an example communication pattern of a conversation, in which an interruption is detected in accordance with one or more embodiments.

FIG. 6B illustrates an example communication pattern 600B of a conversation, in which an interruption is detected in accordance with one or more embodiments. Similar to the communication pattern 600A in FIG. 6A, the conversation starts with a user speech 610B received at the client device 130 and transmitted from the client device 130 to the conversation system 110. Upon receiving the user speech 610B, the conversation system 110 performs speech-to-text operation 620B. Before the conversation system 110 generates a prompt, a second user speech 630B is received at the client device 130 and transmitted to the conversation system 110. Based on the timing of the second user speech 630B, the conversation system 110 detects 635B that an interruption has occurred. The conversation system 110 then performs speech-to-text operation 640B on the second user speech 630B. After that, the conversation system 110 generates 645B a prompt based on both the received first user speech 610B and second user speech 630B, and transmits 650B the prompt to the LLM system 120. Upon receiving the prompt, the LLM system 120 generates 655B a text response and sends 660B the text response back to the conversation system 110. The conversation system 110 performs text-to-speech operation 655B on the received text response to generate 665B a speech response and sends 670B the speech response back to the client device 130, causing the client device 130 to play the speech response to the user.

Notably, in conversation pattern 600B, the interruption is detected after the speech-to-text operation is performed and before a prompt is generated. In other conversation patterns, the interruption may be detected before, during, or after any state of the conversation, including a speech-to-text state, a prompt generation state, a response generation state, a text-to-speech state, and speech playing state, etc. Depending on the state of the conversation or timing of the state when an interruption is detected, the conversation system 110 may react to the interruption differently.

FIG. 7 illustrates an example text record 700 of a conversation in accordance with one or more embodiments. The text record 700 includes text of a user's speech requests 710, 730, and text responses 720, 740 generated by the LLM system 120. The text record 700 also includes metadata associated with the user's speech and responses, including the timing and duration of each speech request or speech response. For example, the conversation starts with a prompt generated based on user request 710 "I would like a recipe for meatloaf." Upon receiving the user request 710, the LLM generates a response 720 including a meatloaf recipe. Before the recipe was finished playing to the user, the user interrupted the response and uttered a second request, 730, "I would like a vegan one, please." The conversation system 110 then generates 730 a new prompt based on the second request. As illustrated, the conversation system 110 annotated the prompt with metadata related to the interruption, "[#Cancel→"I interrupted your answer"]". The LLM system 120 then generates a new response 740 based on the updated prompt.

Text record 700 is merely an example text record of a conversation between a user and an LLM. The interruption is detected following the generation of the first response 720 by the LLM, while this response is being played back to the user. In different communication scenarios, interruptions might be spotted either earlier or later, possibly during the initial stages of the response playback or even before it begins. The timing of the interruption's detection influences how a new prompt is annotated, incorporating varied metadata that reflects the interruption's context, timing, and the predicted intent or sentiment of the user.

Figure 8:
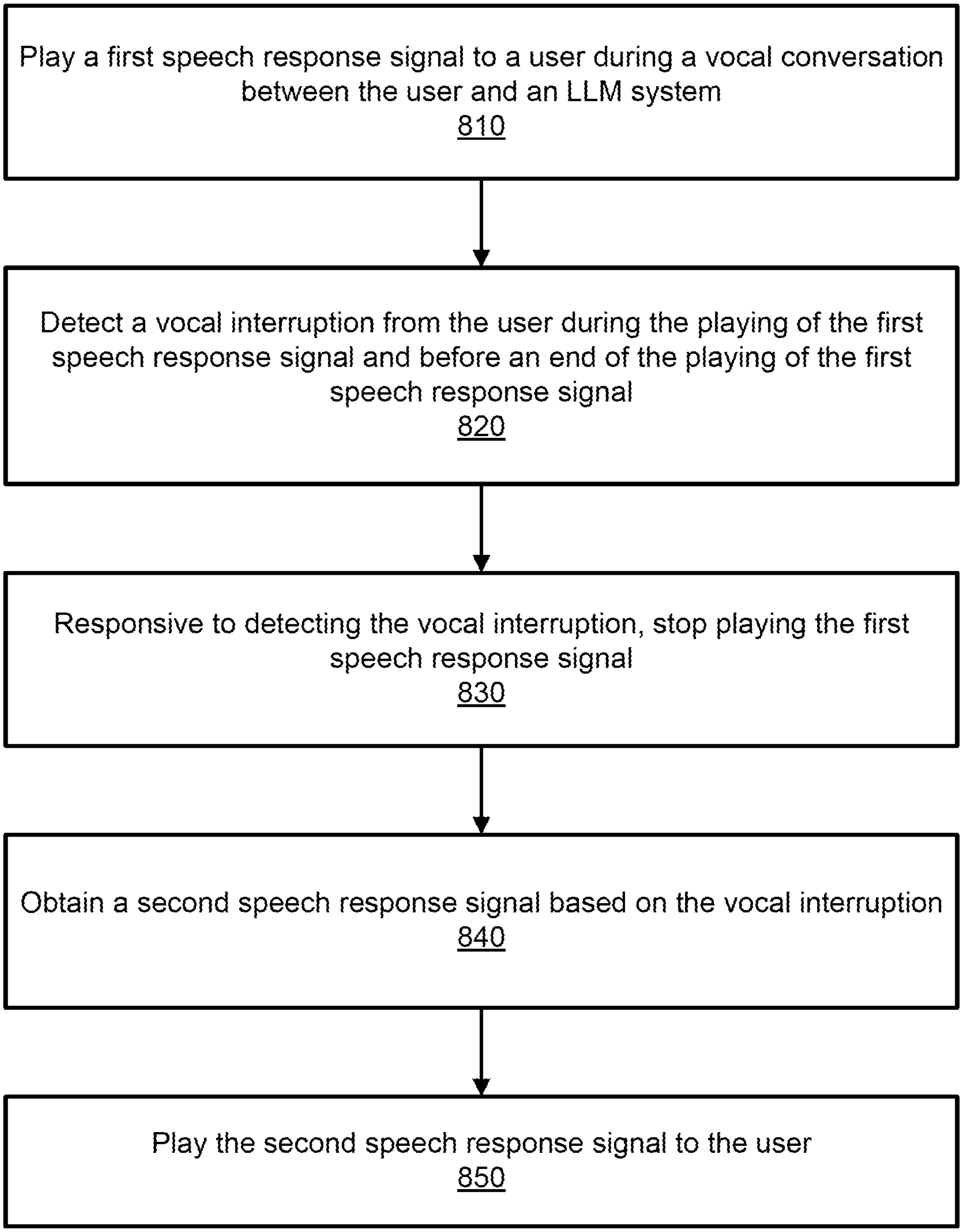
FIG. 8 is a flowchart of a method for managing interruptions during a verbal conversation between users and LLMs in accordance with one or more embodiments.

Example Methods for Managing Interruptions During Verbal Conversations Between Users and LLMs FIG. 8 is a flowchart of a method 800 for managing interruptions during a verbal conversation between users and LLMs in accordance with one or more embodiments. In various embodiments, the method includes different or additional steps than those described in conjunction with FIG. 8. Further, in some embodiments, the steps of the method may be performed in different orders than the order described in conjunction with FIG. 8. The method described in conjunction with FIG. 8 may be carried out by the client device 130, the conversation system 110, or a combination thereof.

The client device 130 plays 810 a first speech response signal to a user during a vocal conversation between the user and an LLM system 120. This speech response signal may be received from the conversation system 110 and generated based on a user's speech. The client device 130 detects 820 a vocal interruption from the user during the playing of the first speech response signal and before the end of the playing of the first speech response signal. The vocal interruption includes a user speech input. The client device 130 may include a listening module configured to constantly listen to a user's speech input before, during, and/or after a speech response signal is being played. In some embodiments, the client device 130 is configured to identify a sound pattern of the first speech response signal and substrates the identified sound pattern from ambient noise and captured audio to isolate the user speech input.

Responsive to detecting the vocal interruption, the client device 130 stops 830 playing the first speech response signal, and obtains 840 a second speech response signal based on the vocal interruption. In some embodiments, the client device 130 records the user speech input and transmits the recorded user speech input to the conversation system 110. Upon receiving the user speech input, the conversation system 110 generates a prompt and sends the prompt to the LLM system 120, causing the LLM system 120 to generate a text response based on the prompt. The conversation system 110 then converts the text response into the second speech response and transmits the second speech response back to the client device 130. Upon receiving the speech response, the client device 130 plays 850 the second speech response signal to the user.

Figure 9A:
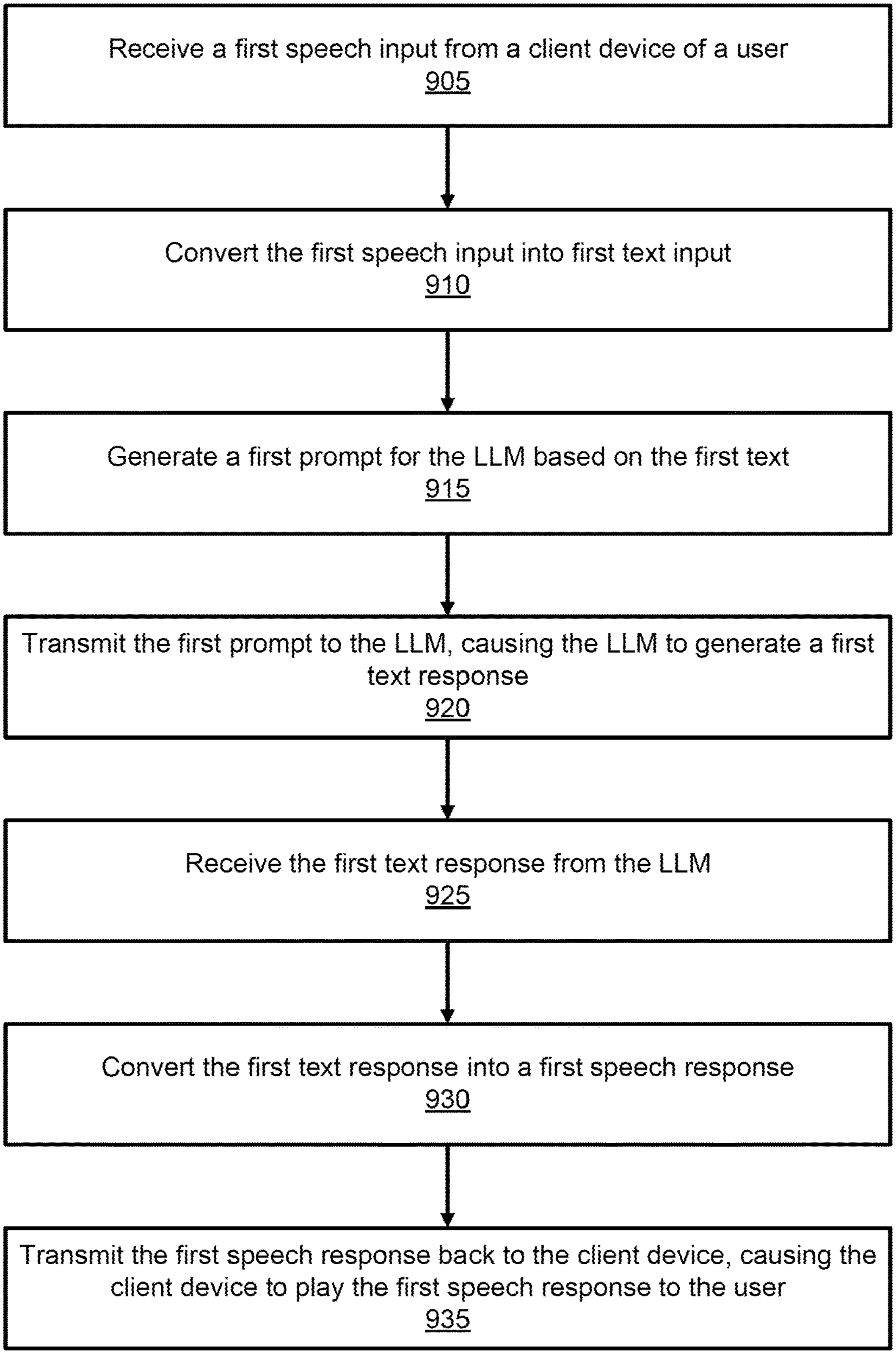
FIGS. 9A-9B is a flowchart of a method for managing interruptions during a verbal conversation between users and LLMs in accordance with one or more embodiments.
Figure 9B:
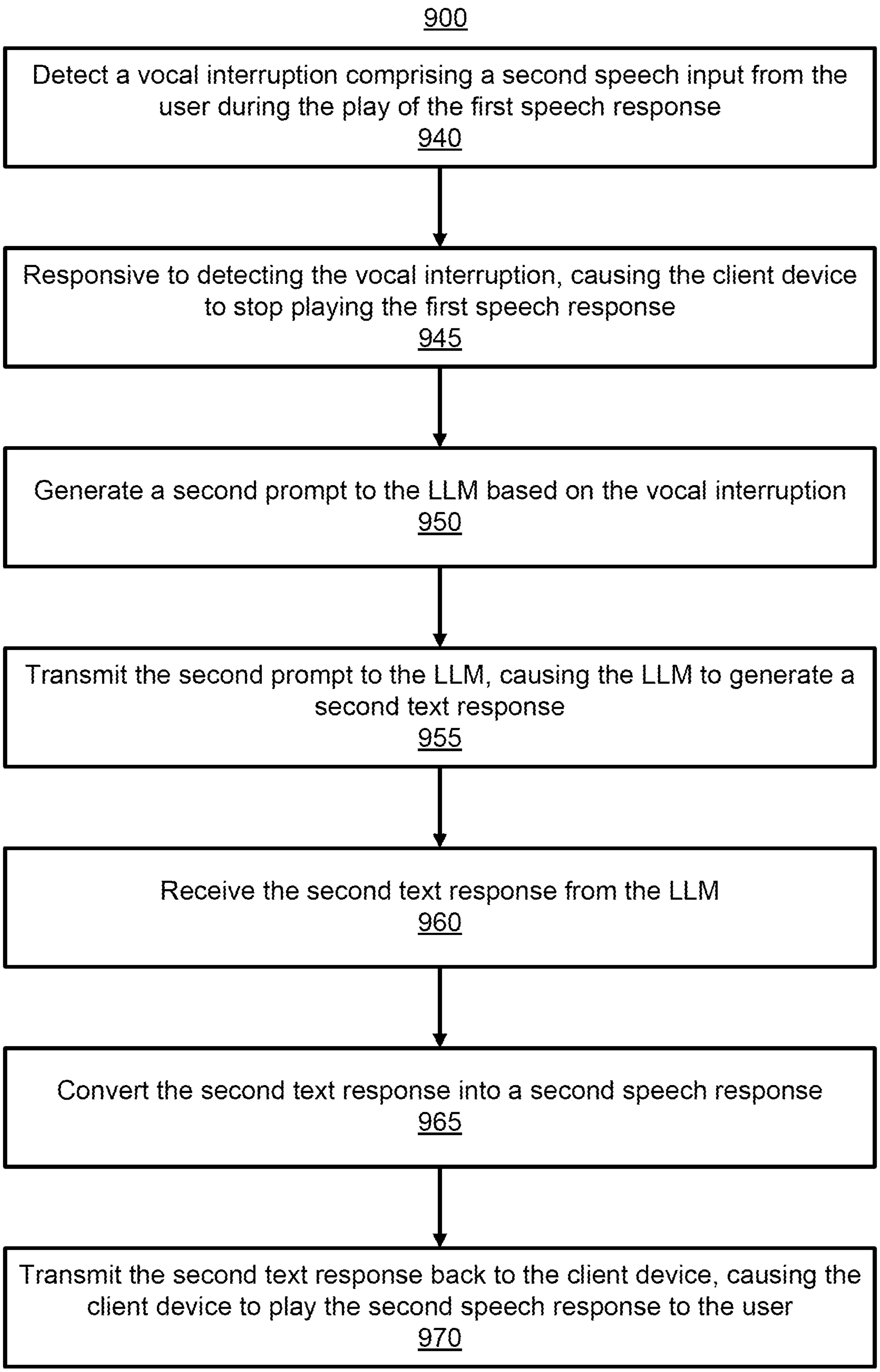

FIGS. 9A-9B is a flowchart of a method 900 for managing interruptions during a verbal conversation between users and LLMs in accordance with one or more embodiments. In various embodiments, the method includes different or additional steps than those described in conjunction with FIGS. 9A-9B. Further, in some embodiments, the steps of the method may be performed in different orders than the order described in conjunction with FIGS. 9A-9B. The method described in conjunction with FIGS. 9A-9B may be carried out by the conversation system 110.

The conversation system 110 receives 905 a first speech input from a client device 130 of a user. Upon receiving the first speech input, the conversation system 110 converts 910 the first speech input into first text input. In some embodiments, the conversation system 110 includes a speech-to-text (STT) module 210 configured to perform STT, converting the first speech input into the first text input. In some embodiments, the STT module 210 implements various machine learning models, such as CNNs, RNNs, and LSTM networks, to process audio signals and determine a likelihood of a sequence of words in a speech input.

The conversation system 110 generates 915 a first prompt for an LLM (e.g., LLM system 120) based on the first text. In some embodiments, the conversation system 110 determines a state of the conversation and incorporates the state of the conversation into the prompt to provide context to the LLM. The conversation system 110 transmits 920 the first prompt to the LLM. Upon receiving the first prompt, the LLM generates a first text response based on the first prompt, and sends the first text response back to the conversation system 110.

The conversation system 110 receives 925 the first text response from the LLM and converts 930 the first text response into a first speech response. In some embodiments, the conversation system 110 includes a text-to-speech (TTS) module 230 configured to convert text responses into speech responses. In some embodiments, the TTS module 230 parses the first text response to understand its structure, converts raw text into a standardized format (including converting abbreviations or special characters into their spoken equivalents), determines pronunciation of each word based on context, such as past tense vs. present tense, and generates a sequence of phonemes. The conversation system 110 transmits 935 the first speech response back to the client device, causing the client device to play the first speech response to the user.

At the same time, the conversation system 110 causes the client device 130 to monitor ambient audio and detect vocal interruptions during the conversation. In some embodiments, the conversation system 110 detects 940 a vocal interruption comprising a second speech input from the user during the play of the first speech response. Responsive to detecting the vocal interruption, the conversation system 110 causes 945 the client device to stop playing the first speech response. The client device 130 captures and sends the second speech input to the conversation system 110. Upon receiving the second speech input, the conversation system 110 generates 950 a second prompt to the LLM based on the vocal interruption, including the second speech input. Note that this second text prompt doesn't just include the second text input; it also integrates metadata related to the vocal interruption. This includes the conversation's state at the moment of interruption, a signal indicating that the user has interrupted the previous response, and/or a time interval between the start of playing the first speech response and the detection of the vocal interruption.

For example, if the vocal interruption occurs within a first threshold time after the start of the first speech response, the timing might suggest that the user has not finished speaking. In such cases, the conversation system 110 could generate a prompt, stating, "Please ignore the previous response; consider not only the original input but also this additional information: [insert new user input here]. Based on this information, generate a fresh response."

As another example, if the vocal interruption occurs beyond a second threshold time since the first speech response began, this timing might suggest that the user has gathered sufficient information from the response and seeks to steer the conversation toward a new topic. Consequently, the conversation system 110 might produce a prompt stating, "I wish to switch topics," causing the LLM to restart a new conversation. In some embodiments, the conversation system 110 may produce a prompt further based on the content or other metadata like vocal tone related to the user speech.

The conversation system 110 transmits 955 the second prompt to the LLM. Again, upon receiving the second prompt, the LLM generates and sends a second text response to the conversation system 110. The conversation system 110 receives 960 the second text response from the LLM and converts 965 the second text response into a second speech response. The conversation system 110 transmits 970 the second text response back to the client device 130, causing the client device 130 to play the second speech response to the user.

In some embodiments, the conversation system 110 applies one or more machine-learning models to data associated with the conversation or data associated with the vocal interruption. One or more machine-learning models are trained over historical conversation data comprising features associated with historical conversations between users and LLMs and interruptions during those conversations. In some embodiments, a machine-learning model may be applied to data associated with the conversation to determine a speech completion score indicating a likelihood of whether the user has finished speaking. Responsive to the speech completion score greater than a threshold, the conversation system generates the first prompt for the LLM.

Notably, in some cases, the vocal interruption may be detected at any point during the conversation. In some embodiments, a machine-learning model may be applied to data associated with the vocal interruption to determine a type of vocal interruption, e.g., type I, II, or III of vocal interruption described above with respect to FIGS. 4A-4C. The conversation system 110 generates the second prompt based on the determined type of vocal interruption.

The vocal interruption may also be analyzed to determine the user's tone and/or sentiment. In some embodiments, the conversation system 110 may be a video conversation system, and the vocal interruption may also be accompanied by visual data. The visual data associated with the interruption may also be analyzed to determine the user's sentiment. The conversation system 110 may also incorporate such data, e.g., the user's tone and/or sentiment, into a prompt. In some embodiments, the conversation system 110 may also generate a continuer response (e.g., "Uhm, go on.") and cause the continuer response to be played prior to generating or delivering the next response from the LLM.

The above-described process may continue as long as the user interacts with the conversation system 110, enabling verbal conversations between users and LLMs that resemble human communication.

Example Computing System

Figure 10:
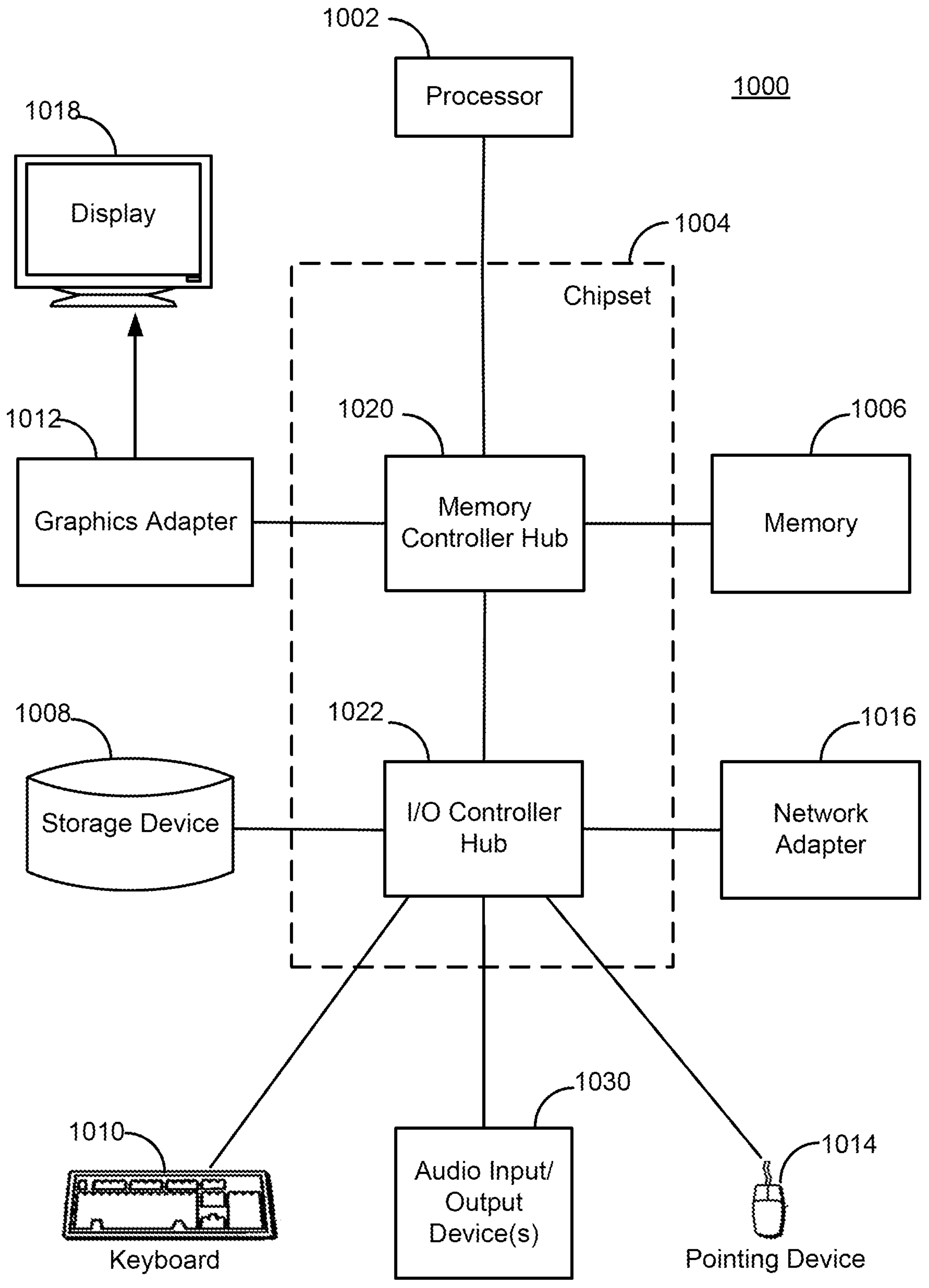
FIG. 10 is a block diagram of an example computer suitable for use in the networked computing environment of FIG. 1.

FIG. 10 is a block diagram of an example computer 1000 suitable for use in the networked computing environment 100 of FIG. 1. The computer 1000 is a computer system and is configured to perform specific functions as described herein. For example, the specific functions corresponding to the conversation system 110 or the LLM system 120 may be configured through the computer 1000.

The example computer 1000 includes a processor system having one or more processors 1002 coupled to a chipset 1004. The chipset 1004 includes a memory controller hub 1020 and an input/output (I/O) controller hub 1022. A memory system having one or more memories 1006 and a graphics adapter 1012 are coupled to the memory controller hub 1020, and a display 1018 is coupled to the graphics adapter 1012. A storage device 1008, keyboard 1010, pointing device 1014, and network adapter 1016 are coupled to the I/O controller hub 1022. Other embodiments of the computer 1000 have different architectures.

In some embodiments, the computer 1000 may also include audio input/output devices 1030, such as one or more microphones, one or more speakers, one or more earphones. The audio input/output devices 1030 are configured to capture speech input from users and deliver audio responses back to the users. In some embodiments, audio input/output devices 1030 may be connected over a phone line. In some embodiments, the computer 1000 may also include visual input/output devices configured to receive video input from users and project video responses back to the users.

In the embodiment shown in FIG. 10, the storage device 1008 is a non-transitory computer-readable storage medium such as a hard drive, compact disk read-only memory (CD-ROM), DVD, or a solid-state memory device. The memory 1006 holds instructions and data used by the processor 1002. The pointing device 1014 is a mouse, track ball, touchscreen, or other types of a pointing device and may be used in combination with the keyboard 1010 (which may be an on-screen keyboard) to input data into the computer 1000. The graphics adapter 1012 displays images and other information on the display 1018. The network adapter 1016 couples the computer 1000 to one or more computer networks, such as network 140.

The types of computers used by the conversation system 110, the LLM system 120, and the client device 130 of FIGS. 1 through 4 can vary depending upon the embodiment and the processing power required by the conversation system 110, the LLM system 120, and the client device 130. For example, the conversation system 110 might include multiple blade servers working together to provide the functionality described. Furthermore, the computers can lack some of the components described above, such as keyboards 1010, graphics adapters 1012, and displays 1018.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for managing interruptions during a verbal conversation between users and Large Language Models (LLMs), comprising:

receiving a first speech input from a client device of a user;

converting the first speech input into first text;

generating a first prompt for an LLM based on the first text;

transmitting the first prompt to the LLM, causing the LLM to generate a first text response;

receiving the first text response from the LLM;

converting the first text response into a first speech response;

transmitting the first speech response back to the client device, causing the client device to play the first speech response to the user;

detecting a second speech input from the user during the play of the first speech response; and in response to detecting an intent to interrupt the first speech response with the second speech input, causing the client device to stop playing the first speech response; and in accordance with a determination that the second speech input is a first type of interruption, wherein the first type of interruption occurs after a threshold time of the first speech response playing:

generating a second prompt to the LLM based on the second speech input;

transmitting the second prompt to the LLM, causing the LLM to generate a second text response;

receiving the second text response from the LLM;

converting the second text response into a second speech response; and transmitting the second speech response back to the client device, causing the client device to play the second speech response to the user; and in accordance with a determination that the second speech input is a second type of interruption, wherein the second type of interruption occurs prior to the threshold time of the first speech response playing, generating a continuer response to signal the user to continue speaking.

2. The method of claim 1, further comprising:

determining a timing of the second speech input; and generating the second prompt based on the timing of the second speech input.

3. The method of claim 2, wherein determining the timing of the second speech input comprises:

determining whether the second speech input is received after a playback threshold time period, wherein the playback threshold time period occurs during a speech playing state; and responsive to determining that the second speech input is received after the playback threshold time period:

canceling a previous conversation; and restarting a new conversation.

4. The method of claim 1, further comprising:

determining a state of the conversation when the second speech input is received; and generating the second prompt to the LLM based on the determined state of the conversation.

5. The method of claim 1, further comprising:

applying a machine-learning model to data associated with the conversation to determine a speech completion score indicating a likelihood of whether the user has finished speaking, wherein the machine-learning model is trained over historical conversation data comprising features associated with historical conversations between users and LLMs and interruptions during the historical conversations; and responsive to the speech completion score greater than a threshold, generating the first prompt for the LLM.

6. The method of claim 1, further comprising:

applying a machine-learning model to data associated with the conversation to determine a complexity score indicating a level of complexity of the conversation, wherein the machine-learning model is trained over historical conversation data comprising features associated with historical conversations between users and LLMs and interruptions during the historical conversations; and responsive to the complexity score greater than a threshold, generating the first prompt for the LLM, causing the LLM to summarize the conversation, thereby verifying with the user that the conversation has been correctly understood.

7. The method of claim 1, wherein determining that the second speech input is the first type of interruption includes applying a machine-learning model to data associated with the second speech input, wherein the machine-learning model is trained over historical conversation data comprising features associated with historical conversations between users and LLMs and interruptions during the historical conversations.

8. The method of claim 1, further comprising:

collecting data associated with the conversation and the second speech input; and retraining or fine-tuning the LLM based on the collected data.

9. The method of claim 1, further comprising:

collecting user feedback on how the second speech input was handled; and retraining or fine-tuning the LLM based on the collected user feedback.

10. The method of claim 1, further comprising:

prior to causing the client to play the first speech response to the user, detecting a third speech input from the user; and in response to detecting the third speech input and in accordance with a determination that the third speech input is a third type of interruption, wherein the third type of interruption occurs prior to playing the first speech response, cancelling playing the first speech response on the client device.

11. A computer program product comprising a non-transitory computer readable storage medium having instructions encoded thereon that, when executed by a processor, cause the processor to:

receive a first speech input from a client device of a user;

convert the first speech input into first text;

generate a first prompt for an LLM based on the first text;

transmit the first prompt to the LLM, causing the LLM to generate a first text response;

receive the first text response from the LLM;

convert the first text response into a first speech response;

transmit the first speech response back to the client device, causing the client device to play the first speech response to the user;

detect a second speech input from the user during the play of the first speech response; and in response to detecting an intent to interrupt the first speech response with the second speech input, cause the client device to stop playing the first speech response; and in accordance with a determination that the second speech input is a first type of interruption, wherein the first type of interruption occurs after a threshold time of the first speech response playing:

generate a second prompt to the LLM based on the second speech input;

transmit the second prompt to the LLM, causing the LLM to generate a second text response;

receive the second text response from the LLM;

convert the second text response into a second speech response; and transmit the second speech response back to the client device, causing the client device to play the second speech response to the user; and in accordance with a determination that the second speech input is a second type of interruption, wherein the second type of interruption occurs prior to the threshold time of the first speech response playing, generating a continuer response to signal the user to continue speaking.

12. The computer program product of claim 11, further comprising:

determining a timing of the second speech input; and generating the second prompt based on the timing of the second speech input.

13. The computer program product of claim 12, wherein determining the timing of the second speech input comprises:

determining whether the second speech input is received after a playback threshold time period, wherein the playback threshold time period occurs during a speech playing state; and responsive to determining that the second speech input is received after the playback threshold time period:

canceling a previous conversation; and restarting a new conversation.

14. The computer program product of claim 11, further comprising:

determining a state of a current conversation between the user and the LLM when the second speech input is received; and generating the second prompt to the LLM based on the determined state of the current conversation.

15. The computer program product of claim 11, further comprising:

applying a machine-learning model to data associated with a current conversation between the user and the LLM to determine a speech completion score indicating a likelihood of whether the user has finished speaking, wherein the machine-learning model is trained over historical conversation data comprising features associated with historical conversations between users and LLMs and interruptions during the historical conversations; and responsive to the speech completion score greater than a threshold, generating the first prompt for the LLM.

16. The computer program product of claim 11, further comprising:

applying a machine-learning model to data associated with a current conversation between the user and the LLM to determine a complexity score indicating a level of complexity of the current conversation, wherein the machine-learning model is trained over historical conversation data comprising features associated with historical conversations between users and LLMs and interruptions during the historical conversations; and responsive to the complexity score greater than a threshold, generating the first prompt for the LLM, causing the LLM to summarize the current conversation, thereby verifying with the user that the current conversation has been correctly understood.

17. The computer program product of claim 11, wherein determining that the second speech input is the first type of interruption includes applying a machine-learning model to data associated with the second speech input, wherein the machine-learning model is trained over historical conversation data comprising features associated with historical conversations between users and LLMs and interruptions during the historical conversations.

18. The computer program product of claim 11, further comprising:

collecting data associated with a current conversation between the user and the LLM and the second speech input;

collecting user feedback on how the second speech input was handled; and retraining or fine-tuning the LLM based on the collected data or collected user feedback.

19. A method for managing interruptions during verbal conversations between users and Large Language Models (LLMs), comprising:

playing a first speech response signal on a client device of a user during a vocal conversation between the user and an LLM system;

detecting a second speech input from the user during the playing of the first speech response signal and before an end of the playing of the first speech response signal;

in response to detecting an intent to interrupt the first speech response signal with the second speech input, stopping playing the first speech response signal; and in accordance with a determination that the second speech input is a first type of interruption, wherein the first type of interruption occurs after a threshold time of the first speech response signal playing:

generating, by the LLM system, a second speech response signal based on the second speech input; and playing the second speech response signal on the client device of the user; and in accordance with a determination that the second speech input is a second type of interruption, wherein the second type of interruption occurs prior to the threshold time of the first speech response signal playing, generating a continuer response to signal the user to continue speaking.

20. The computer program product of claim 11, further comprising:

prior to causing the client to play the first speech response to the user, detect a third speech input from the user; and in response to detecting the third speech input and in accordance with a determination that the third speech input is a third type of interruption, wherein the third type of interruption occurs prior to playing the first speech response, cancel playing the first speech response on the client device.

* * * * *